United States Patent

Wakefield

[15] 3,638,752

[45] Feb. 1, 1972

[54] SEISMIC SIGNAL GENERATOR

[72] Inventor: Ralph V. Wakefield, Terre Haute, Ind.

[73] Assignee: Commercial Solvents Corporation, Terre Haute, Ind.

[22] Filed: Sept. 13, 1968

[21] Appl. No.: 795,368

Related U.S. Application Data

[63] Continuation-in-part of Ser. No. 755,457, Aug. 26, 1968, abandoned, Continuation-in-part of Ser. No. 591,243, Nov. 1, 1966, abandoned, Continuation-in-part of Ser. No. 800,332, Jan. 24, 1969, abandoned, Continuation-in-part of Ser. No. 639,941, May 15, 1967, abandoned, Continuation-in-part of Ser. No. 415,876, Dec. 4, 1964, abandoned.

[52] U.S. Cl. ............... 181/0.5 R, 181/0.5 H, 181/0.5 AG, 340/12 R
[51] Int. Cl. ............................................. G01v 1/00
[58] Field of Search ...................................... 181/5

[56] References Cited

UNITED STATES PATENTS

| | | | |
|---|---|---|---|
| 2,083,697 | 6/1937 | Dull | 181/.5 |
| 2,083,976 | 6/1937 | Armstrong | 181/.5 |
| 2,858,764 | 11/1958 | Hesson et al | 181/.5 |
| 3,041,970 | 7/1962 | Foster | 181/.5 |
| 3,111,898 | 11/1963 | Foster | 181/.5 |
| 3,249,177 | 5/1966 | Chelminski | 181/.5 |
| 3,331,050 | 7/1967 | Kilmer et al. | 181/.5 |
| 3,379,273 | 4/1968 | Chelminski | 181/.5 |
| 3,454,127 | 7/1969 | Malme | 181/.5 |

*Primary Examiner*—Rodney D. Bennett, Jr.
*Assistant Examiner*—Joseph G. Baxter
*Attorney*—John W. Behringer, Eugene L. Bernard, Martin J. Brown, James N. Dresser, W. Brown Morton, Jr., John T. Roberts and Malcolm L. Sutherland

[57] ABSTRACT

An assembly for creating pneumatic impulses, e.g., forming a seismic signal comprising a casing including a gas differential pressure system defining a main chamber and a smaller control chamber connected by an orifice, each adapted to contain a high-pressure gas. Impulse producing exhaust ports are provided in the main chamber, gas inlet means are included for either of the main and control chambers and secondary exhaust means are provided for the control chamber. The differential pressure system includes a slidable element for opening and closing the impulse producing exhaust ports responsive to a force differential across the main and control chambers, the force applied to the slidable element in closed position from the control chamber being greater than that applied from the main chamber, and external valve means for rapidly reducing the control chamber pressure. Different embodiments of the assembly include means for directing the impulse and assemblies wherein high-pressure gas may be continuously fed to the main chamber.

38 Claims, 15 Drawing Figures

INVENTOR.
RALPH VINCENT WAKEFIELD
BY
McLean, Morton and Boustead
ATTORNEYS

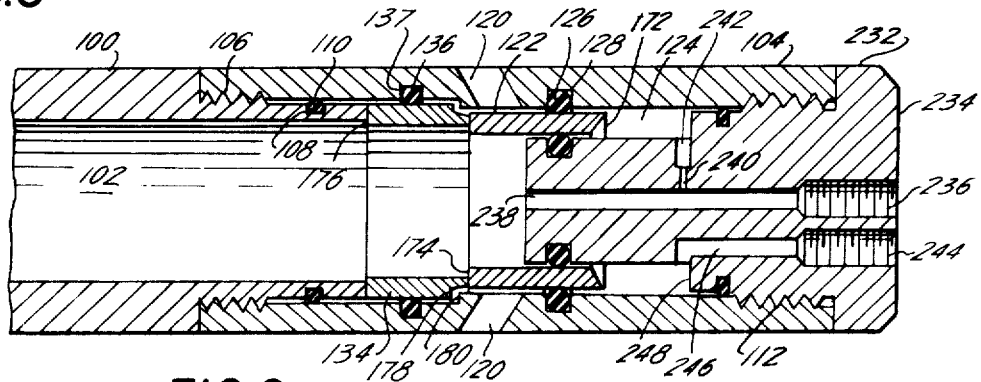
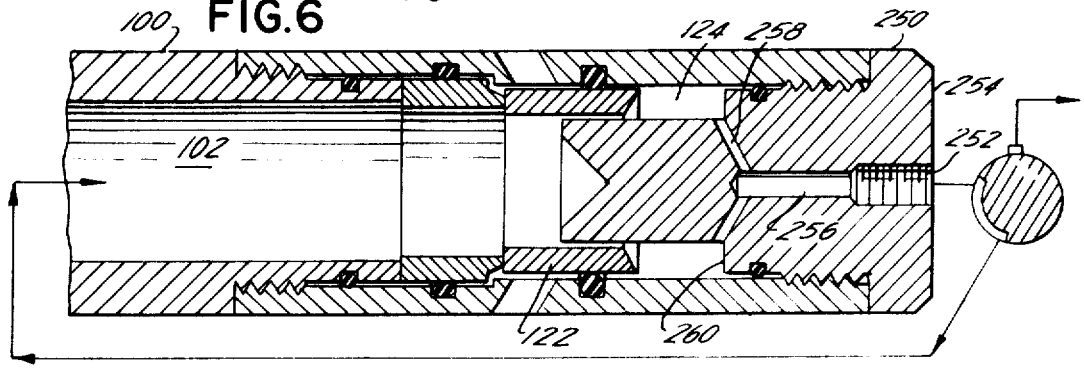
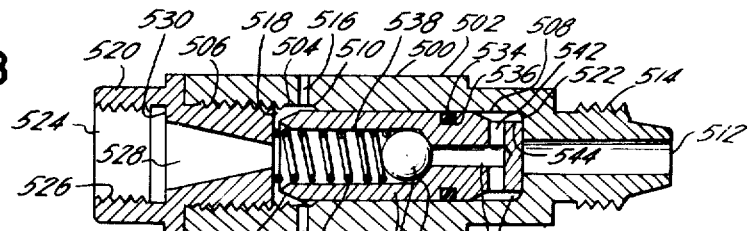
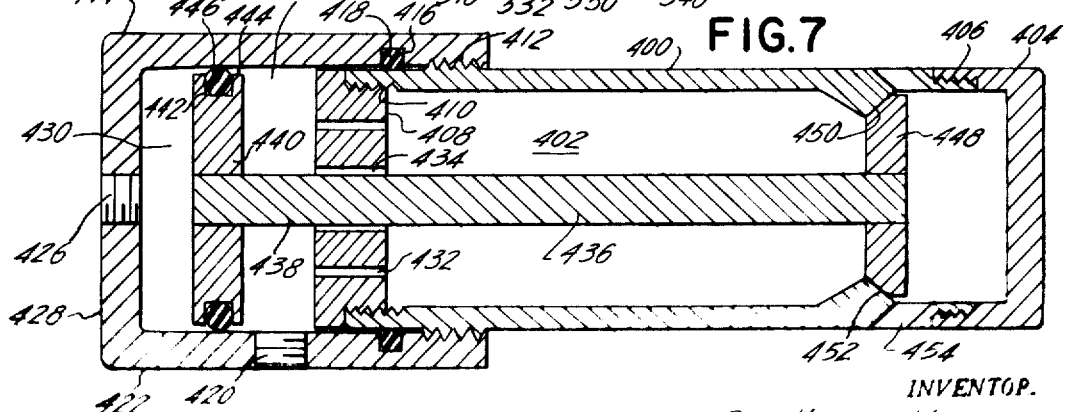

INVENTOR.
RALPH VINCENT WAKEFIELD
BY
McLean, Morton and Boustead
ATTORNEYS

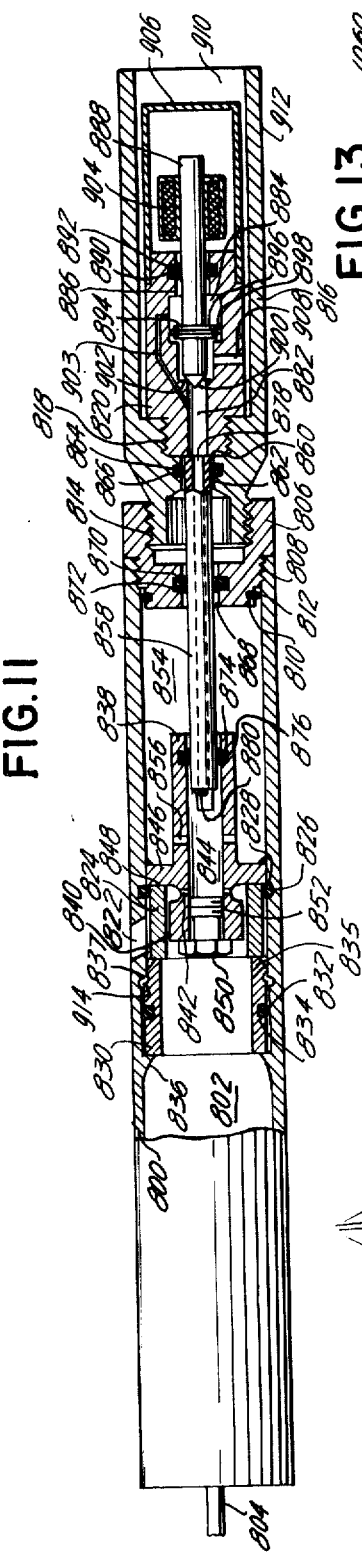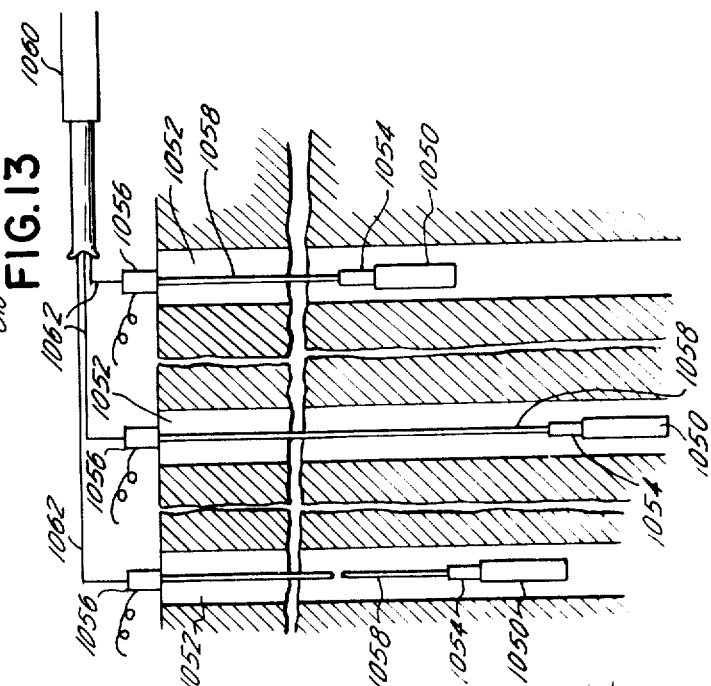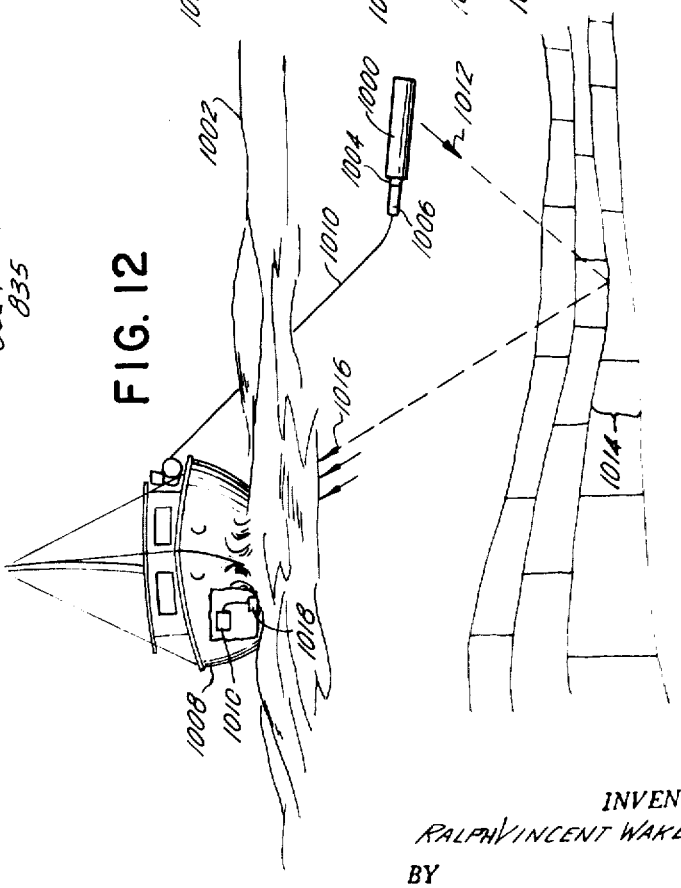

INVENTOR
RALPH V. WAKEFIELD

BY
McLean, Morton & Boustead
ATTORNEYS

INVENTOR
RALPH V. WAKEFIELD

BY McLean, Morton & Boustead
ATTORNEYS

SEISMIC SIGNAL GENERATOR

RELATION TO PRIOR APPLICATIONS

This application is a continuation-in-part of each of the following applications, all now abandoned:
Ser. No. 755,457, filed Aug. 26, 1968
Ser. No. 591,243, filed Nov. 1, 1966
Ser. No. 800,332, filed Jan. 24, 1969
Ser. No. 639,941, filed May 15, 1967
Ser. No. 415,876, filed Dec. 4, 1964.

This invention relates to an apparatus for seismically exploring land and water-covered areas in a safe and efficient manner.

Systems for underground and underwater geophysical prospecting usually involve (a) a sound portion-for producing a sound wave and directing the wave to, and reflecting it from, an area under exploration, and (b) a detection and recordation portion for detecting the reflected waves and the recording variations in their frequency and amplitude. The recorded variations are interpreted to provide an indication of the nature of the area under exploration.

Geophysical prospecting systems have been evaluated on the basis of their safety and efficiency in obtaining worthwhile information regarding the areas under exploration. Systems in present use underwater include the firing of explosives or the bursting of inflatable gas bags to produce sound waves. Such systems are hazardous and/or inefficient. Underground systems presently in use also include the firing of explosives.

It is an object of this invention to provide a safe and efficient system for seismically exploring land and water-covered areas.

According to the invention, sound waves are provided which are of sufficient strength to penetrate to, and reflect from, the area under exploration, are in a relatively narrow range of frequency, are of a relatively constant amplitude such that they are relatively specific, and which thus give greater significance to the variations in frequency and amplitude produced by the various strata in the reflected wave such that these variations will not be obscured by similar variations in the initial sound wave and can be automatically produced. The present invention further provides a system capable of producing sound waves of similar character at a rapid rate and at any predetermined pressure or interval variable at will.

This invention provides an assembly for creating pneumatic impulses comprising a casing including a differential pressure system defining a main chamber and a control chamber adapted to contain a high-pressure gas, impulse-producing exhaust ports and gas inlet means in the main chamber, the differential pressure system including an element for opening and closing the impulse-producing exhaust ports responsive to he pressure differential across the main and control chambers, gas inlet and secondary exhaust means in the control chamber, the gas inlet means for the control chamber being adapted to be connected to a high-pressure gas source, the higher pressure portion of the differential pressure system during filling of the assembly with high-pressure gas including the control chamber.

The seismic system of the present invention involves apparatus for producing underground or underwater sound waves or pulses forming a seismic signal. In general, the pulse is produced by a valving arrangement in a rigid, nonbursting, reusable, compressed gas-holding container in which the valving arrangement upon command provides a sudden release of a charge of compressed gas which has a quasiexplosive effect and produces a pulse, i.e., sharp bang, forming the seismic wave. Preferably, the physical arrangement of the container is such that the pulse is directional. The gas-holding container is adapted to contain a charge of compressed gas at pressures of from about 2,000 to about 20,000 p.s.i.a., preferably about 5,000 to about 12,000 p.s.i.a. The valving arrangement is designed automatically to discharge the container at a time interval that can be predetermined and changed at will from a point remote to the acoustic generator, and the discharge interval can be changed at will over an almost unlimited time range. A highly compressed nonexplosive gas is used, e.g., compressed air, or any other suitable gas. For seismographic purposes, a sufficient amount of the gas in the container is released within a sufficiently short period of time to produce a pulse useful for seismographic purposes. The frequency of the seismic pulse is important, and is a function of discharge pressure, port design and amount of air exhausted, among other things. In general, the container of the present invention should have a main chamber with a volume of from about 10 to about 200 cubic inches, e.g., with an inside diameter of from about 1 to about 3 inches and a length of from about 4 to about 30 inches. Furthermore, in general, at least one-fourth, preferably at least one-half, of the gas in the main chamber should be discharged in at least about 10 milliseconds, preferably in about 3 milliseconds, and most preferably in about 1 millisecond. The exhaust port valve closes at a residual pressure in the main chamber of about 500 to about 6,000 p.s.i.a., preferably about 1,500 to about 5,000 p.s.i.a. The closing of the exhaust port valve is accomplished by reducing the pressure in the control chamber to a level where the force applied on the control chamber side of the exhaust port valve is greater than the force created by the residual pressure in the main chamber.

The effect of the sudden release of compressed gas from the main chamber is to produce a sharp bang during the initial period, e.g., up to 10 milliseconds, useful to produce a seismic wave, followed by an extended blow period, e.g., up to about 0.2 seconds, during which the gas remaining in the main chamber is more slowly released. It is desirable to keep the blow period short since it may tend to obscure the seismic records. The blow period can be reduced, as desired, for example, by raising the pressure level to which the control chamber is reduced so that the exhaust port valve closes at a higher residual pressure, or by changing the physical shape of the container such as by making it larger in diameter and shorter in length and enlarging the discharge ports. Also, as may be expected, the larger volume chambers create more disturbance beneath the water and the selection of a particular chamber volume may be influenced by this fact. The system of the present invention can produce a series of pulses automatically at any predetermined pressure, volume and interval by adjustment of the valving at which the valving arrangement discharges the container, speed with which the container is charged, volume of the container, etc. Furthermore, the quantity of energy developed by the sudden release of a given charge of compressed gas, and consequently the frequency and amplitude of the pulse produced, can be controlled within relatively wide limits by varying the pressure at which the charge is released. Additionally, pulses having substantially similar characteristics can be repeatedly and quickly produced. In underwater seismographic exploration the compressed gas is normally released at exact intervals, e.g., 7 seconds is a standard period, but generally at intervals of less than about 10 seconds. The mechanism of this invention allows the compressed or high-pressure gas in the main chamber of the acoustic generator to be released on signal within about ±6 milliseconds of the specific interval time. Preferably it can be released within about ±2 milliseconds of the specific interval time.

The exhaust port valve can often be a sleeve valve. In any event, the exhaust port valve must: (a) open quickly with minimal throttling action, (b) remain open with minimal flutter action, and (c) close rapidly after discharge so as to prevent any extraneous material from entering the cartridge. Retention of a sufficiently high residual gas pressure in the main chamber after discharge helps to keep any extraneous material out of the cartridge.

The gas-holding containers employed in the present invention for producing the sound wave generally comprise a rigid compressed gas-holding cartridge (or a series of such cartridges) containing a compressed gas which is suddenly released to produce the sound wave. The cartridge is formed of a high-strength material and is provided with a valve member which very rapidly releases the gas from the cartridge body. The amount of pressure that can be built up in the cartridge body is dependent only upon the strength of the valve member and cartridge body, provided sufficiently pressurized gas can be delivered. Generally, the cartridge is connected by a high-pressure line to a remote gas compressor or other source of compressed gas and is fired at a predetermined point in time, which may be part of a time interval arrangement. An inlet valve arrangement controls flow of gas into the cartridge and can, for example, be attached to the cartridge. Cartridge-conduit systems for connecting a number of such compressed gas blasting cartridges to one source of supply and discharging the cartridges consecutively can also be used.

A detecting and recording portion is provided in combination with the apparatus for recording the pulse. The detecting portion is of conventional construction and is responsive to seismic waves produced by each pulse for generating electrical signals representative of the seismic waves. Means are also provided for recording said signals for production of a visual indication of the nature of subsurface strata.

The description of the apparatus of this invention will be more clearly apparent from the following specification together with the drawings in which:

FIG. 5 is a longitudinal sectional view of a device illustrating another embodiment of this invention;

FIG. 6 is a longitudinal sectional view of a device illustrating another embodiment of this invention;

FIG. 7 is a longitudinal sectional view of a device illustrating another embodiment of this invention and a schematic representation of part of the compressed gas feed and exit system wherein a crosscut sectional view of the three-way solenoid valve is shown;

FIG. 8 is a longitudinal sectional view of a two-way check valve;

FIG. 11 is a longitudinal sectional view of a device illustrating another embodiment of this invention;

FIG. 12 is a diagrammatic representation of the seismic system of the present invention positioned underwater;

FIG. 13 is a cross-sectional view of the seismic system of the present invention which consists of three individual cartridges, positioned separately under ground;

Figure 1:
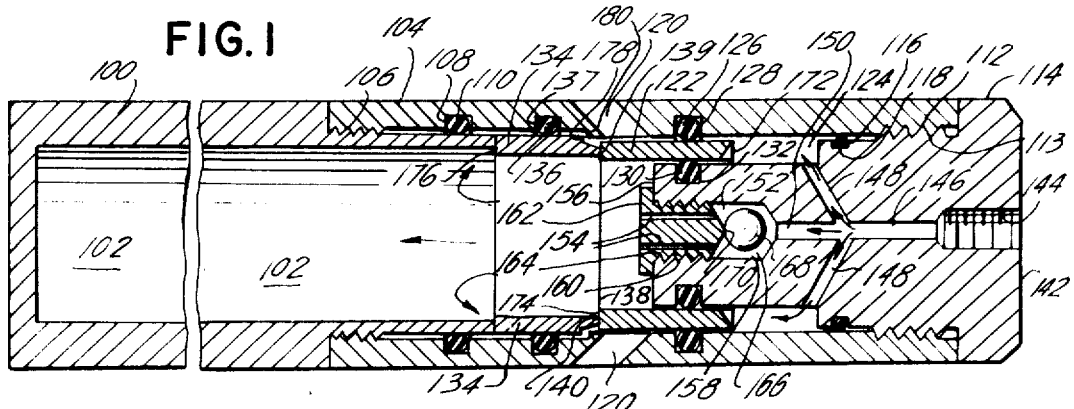
FIG. 1 is a longitudinal sectional view of at device illustrating an embodiment of this invention wherein the sleeve valve is in a position sealing the impulse-producing exhaust port.

Referring to FIG. 1 of the drawings, elongated cylindrical body member 100 is formed of steel or equivalent material of a strength to contain gas under high pressure, e.g., at about 6,000 to about 20,000 p.s.i.a. Cylindrical body member 100 forms main chamber 102 and is open at one end and capped at the opposite end. The open end of cylindrical body member 100 is a screw threadedly attached to head cylinder 104 as indicated at 106. Head cylinder 104 is provided with groove 108 proximate the end screw threadedly attached to cylindrical body member 100 to accommodate a resilient sealing means such as O-ring 110 to complete the seal between cylindrical body member 100 and head cylinder 104. The end of head cylinder 104 remote from cylindrical body members 100 terminates in internally threaded portion 112 by means of which it is screw threadedly attached to externally threaded portion 113 of cylinder plug 114. The joint between head cylinder 104 and cylinder plug 114 is sealed by means of resilient O-ring 116 positioned in groove 118 in cylinder plug 114.

Head cylinder 104 is provided with a plurality of lateral exhaust ports 120 which are spanned and closed by sleeve valve 122 when it is in the sealing or left-hand position. Sleeve valve 122 is slidably mounted within control chamber 124 between O-ring 126 in groove 128 of head cylinder 104 and O-ring 130 in groove 132 of cylinder plug 114. Sleeve valve seat 134 is slidably mounted within head cylinder 104 and is in sealing engagement with head cylinder 104 by means of O-ring 136 in groove 137. End 138 of sleeve valve seat 134 in contact with face 139 of sleeve valve 122 is in the form of modified knife edge 140. Face 139 of sleeve valve 122 and face 138 of modified knife edge 140 are both cylindrical with the internal diameter of sleeve valve 122 being slightly smaller than the internal diameter of sleeve valve seat 134. It will be readily appreciated that terminal portion 140 of sleeve valve seat 134 can assume any desired configuration to provide a metal-to-metal seal between sleeve valve 122 and sleeve valve seat 134.

Cylinder plug 114 is provided on its external face 142 with cylindrical bore 144 for introducing compressed gas into control chamber 124 and main chamber 102. Cylindrical bore 144 is screw threaded so a compressed gas source can be screw threadedly attached. Cylindrical bore 144 might typically be large enough to accommodate a compressed gas line having an internal diameter of 3 1/16 inches. Cylindrical bore 144 is in communication with control chamber 124 through passageway 146 and passageways 148, in order, which route, including cylindrical bore 144, is designated Route A, and is in communication with main chamber 102 through passageway 146, passageway 150, ball valve chamber 152, and passageways 154, in order which route, including cylindrical bore 144, is designated Route B. Cylinder plug 114 is provided on its face 156 with cylindrical bore 158 which has internally threaded portion 160. Ball valve plug 162 has externally threaded portion 164 by which means it is screw threadedly attached to cylinder plug 114 by means of internally threaded portion 160. Ball valve chamber 152 is formed when ball valve plug 162 is attached as above to cylinder plug 114. In total, ball valve 166 consists of ball valve chamber 152 and ball 168. Ball valve plug 162 has plurality of passageways 154 which allows ball valve chamber 152 to be in communication with main chamber 102. Since ball valve plug 162 is outwardly tapered (point 170) on the end facing ball valve chamber 152, when compressed gas is introduced into main chamber 102, ball 168 is forced against point 170 which keeps ball 168 from obstructing or closing passageways 154 to the flow of the compressed gas into main chamber 102.

In operation, compressed gas is delivered into control chamber 124 via route A from a compressor or other suitable source not shown. Compressed gas is delivered into main chamber 102 via route B. The pressure buildup in control chamber 124 is faster than the pressure buildup in main chamber 102, due in part to the orifice effect of passageways 154. This pressure differential during the pressure buildups of the chambers helps to hold sleeve valve 122 snugly against sleeve valve seat 134, which in turn is pressed against cylindrical body 100. An important factor in keeping sleeve valve 122 closed is that the force developed by the pressure of the compressed gas in control chamber 124 acting on end surface 172 of sleeve valve 122 is greater than the force developed by the pressure of the compressed gas in main chamber 102 acting on exposed end surface 174 of sleeve valve 122 and exposed end surface 176 of sleeve valve seat 134. To wit, the effective cross-sectional area of end surface 172 is greater than the effective cross-sectional areas exposed end surfaces 174 and 176. Even when the pressures in main chamber 102 and control chamber 124 are essentially equal to each other, the force applied to end surface 172 is still greater. End surface 172 of sleeve valve 122 is beveled in an inwardly direction to allow the compressed gas to enter control chamber 124 when sleeve valve 122 is in the extreme right-hand position. Lateral exhaust ports 120 remain sealed by sleeve valve 122 during the period of pressure buildup within cartridge 100 and any subsequent equilibrium conditions.

Figure 2:
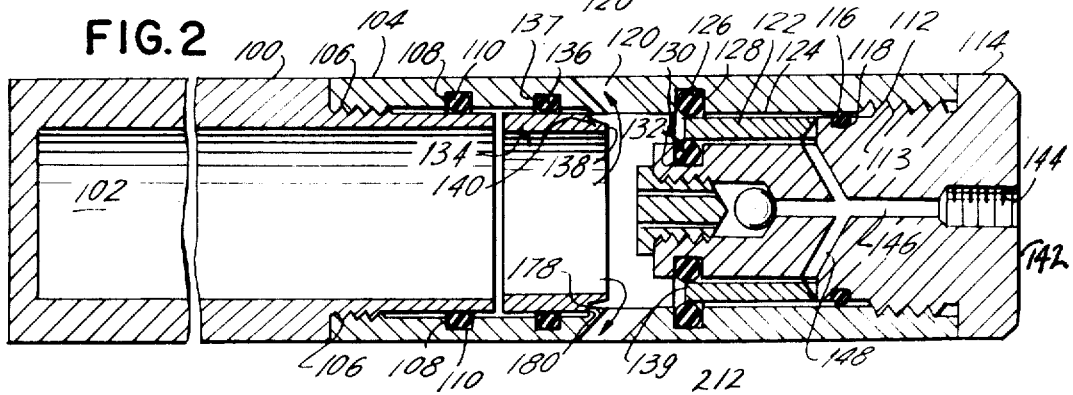
FIG. 2 is a longitudinal sectional view similar to FIG. 1 except that the sleeve valve is in a position whereby the impulse-producing exhaust port is open.

At the desired point in time, the pressure in control chamber 124 is reduced substantially instantaneously by the substantially instantaneous liberation of the gas from control chamber 124 via route A. The pressure reduction in control chamber 124 can be carried out in any convenient manner. The rapid reduction of pressure in control chamber 124 causes the forces acting upon end surface 172 to decrease substantially instantaneously, which in turn causes sleeve valve 122 to rapidly slide to the right into control chamber 124, which has been effectively evacuated, thereby exposing lateral exhaust ports 120 and permitting the instantaneous discharge of the gas in main chamber 102. The gas in main chamber 102 has acted against exposed end surfaces 174 and 176, moving both sleeve valve 122 and sleeve valve seat 134 to the right, only sleeve valve seat 134 is quickly stopped in its movement by the contacting of lip 178 of sleeve valve seat 134 with lip 180 of head cylinder 104. This is shown in FIG. 2, nd typically the movement of sleeve valve seat 134 is in the order of one-sixteenth inch or less, depending upon design. The gas is liberated substantially instantaneously and its sudden release results in a pulse, i.e., a sharp bang, which generates a seismic signal in the water or underground. The gas in main chamber 102 is allowed up to about 10 milliseconds to discharge, leaving a residual pressure in main chamber 102. At the end of that time period, lateral exhaust ports 120 are sealed off by closing sleeve valve 122. To achieve the closing, compressed gas is delivered into chamber 124 via route A and the cycle starts again. In this embodiment of the invention, the sound waves or shock waves can be concentrated, in a directional sense, by use of a deflector.

Ball 168 may be removed if passageways 154 are definitely small enough to act as orifices, thereby serving the same purposes during operation.

It may be desirable to place a three-way solenoid valve in the compressed gasline, and then attach a two-way solenoid valve to the three-way solenoid valve. The gas can then be exhausted out the two-way solenoid valve when the three-way solenoid valve is in position whereby the compressed gas source is valved off.

Figure 3:
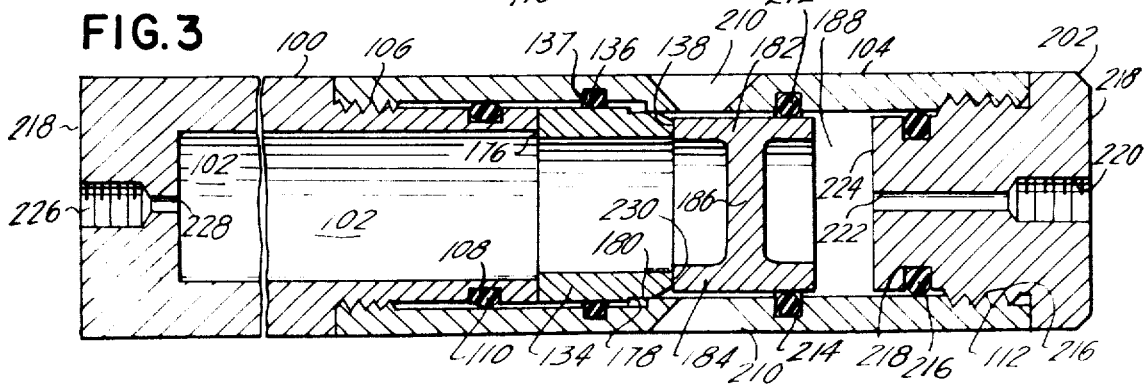
FIG. 3 is a longitudinal sectional view of a device illustrating another embodiment of this invention.

The structure of the cartridge illustrated in FIG. 3 is another embodiment of the invention, although it is somewhat similar to the cartridge illustrated in FIg. 1. The cartridge in FIG. 3 differs from the embodiment in FIG. 1 primarily in that gas is introduced through a separate entrance directly into main chamber 102. Also, in contrast to sleeve valve 122 in FIG. 1, valve 182, while having cylindrical wall 184, has web section 186 which is located in the hollow core portion of cylindrical wall 184. In FIG. 3, valve 182 is slidable within head cylinder 104 between main chamber 102 and control chamber 188.

Figure 4:
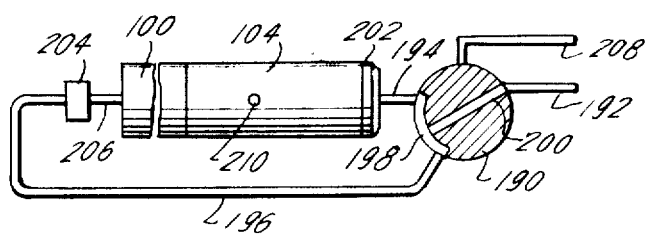
FIG. 4 is a diagrammatic representation illustrating the cartridge of FIG. 3, and part of the associated compressed gas feed and exit system wherein a crosscut sectional view of the three-way solenoid valve is shown.

Referring to FIG. 4, the gas delivery and exit system of the cartridge in FIG. 3 is demonstrated. Compressed gas is delivered to three-way solenoid valve 190, which in FIG. 4 is in the gas fill position, via line 192. In operation, the compressed air enters lines 194 and 196 from slot 198 after passing through passageway 200 in solenoids valve 190. Line 194 is attached to cylinder plug 202 which has a flow passageway into control chamber 188 (see FIG. 3). Line 196 leads to orifice 204 which impedes the gas flow, via line 206, which is attached to cylinder body 100, into main chamber 102 (see FIG. 3). The flow rate into main chamber 102 can be varied by varying the size of orifice 204. A typical orifice size is one sixty-fourth inch diameter. Gas delivery continues until a predetermined point in time when solenoid valve 190 is switched into its dump position, namely, where slot 198 allows gas flow from control chamber 188 through line 194 into line 208 and on out to the atmosphere. The, then, greater pressure in main chamber 102 causes valve 182 (see FIG. 3) to open, whereby the gas within main chamber 102 is liberated substantially instantaneously via exhaust ports 210, located in head cylinder 104. Impurities in the air may cause maintenance problems with the solenoid, so the compressed gaslines may have to be equipped with a filter. Orifice 204 can be replaced by a two-way solenoid valve. Three-way solenoid valve 190 can be replaced by any appropriate combination of two-way solenoid valves.

Referring again to FIG. 3, head cylinder 104 is provided with plurality of exhaust ports 210 which are spanned and closed by valve 186 when it is in the sealing or left-hand position. The slidable seal between valve 186 and head cylinder 104 is achieved on the side of exhaust ports 210 towards cylinder plug 202 by resilient O-ring 212 in groove 214 of head cylinder 104.

The end of head cylinder 104 remote from cylindrical body member 100 terminates in internally threaded portion 112 by means of which it is attached to externally threaded portion 216 of cylinder plug 202. Cylinder plug 202 is provided on its external face 218 with cylindrical bore 220 for introducing a compressed gas into control chamber 188. Cylindrical bore 220 is screw threaded so a compressed gas source can be screw threadedly attached. Cylindrical bore 220 is in communication with control chamber 188 through passageway 222. This route, including cylindrical bore 220, is designated route C. Face 224 of cylinder plug 202 which faces control chamber 188 serves as a stop for valve 186 when valve 186 is in the nonsealing or right-hand position.

Cylindrical body member 100 is provided (in FIG. 3) on its external face 218 with cylindrical bore 226 for introducing compressed gas into main chamber 102. Cylindrical bore 226 is screw threaded so a compressed gas source can be screw threadedly attached. Cylindrical bore 226 is in communication with main chamber 102 through passageway 228. This route, including cylindrical bore 226, is designated route D. Face 230 of valve 182 remote from cylinder plug 202 extends inwardly further than does face 138 of valve seat 134.

In operation, compressed gas is delivered into control chamber 188 via route C from a suitable source not shown. Compressed gas is delivered into main chamber 102 via route D. By controlling the respective flow rates, the pressure buildup in control chamber 188 is faster than the pressure buildup in main chamber 102. From this point on, the operation is similar to the operation of the embodiment demonstrated in FIGS. 1 and 2. The greater force applied on the end of valve 182 nearest cylinder plug 202 holds valve 182 snugly against valve seat 134, which in turn is held snugly against cylindrical body member 100. At the desired point in time, the pressure in control chamber 188 is reduced substantially instantaneously by the substantially instantaneous liberation of gas from control chamber 188 via route C. Almost simultaneously, valve 186 slides to the right towards cylinder plug 202, thereby exposing exhaust ports 210 and permitting the discharge therethrough of the gas in main chamber 102. This sudden release of gas results in a pulse, i.e., a sharp bang, which generates a seismic signal in water or underground. The cycle starts again by the delivery of gas to control chamber 188, thereby moving valve 184 into sealing position, and main chamber 102, respectively, in the prescribed manner.

The structure of the cartridge illustrated in FIG. 5 is another embodiment of the invention, although it is very similar to the cartridge illustrated in FIg. 1. The cartridge in FIG. 5 differs from the embodiment in FIG. 1 primarily in that compressed gas is delivered to control chamber 124 and main chamber 102 at all times during operation. Cylinder plug 232 is provided on its external face 234 with cylindrical bore 236 for introducing compressed gas into main chamber 102. Cylindrical bore 236 is screw threaded so that a compressed gas source can be screw threadedly attached. Cylindrical bore 236 is in communication with main chamber 102 through passageway 238. This route, including cylindrical bore 236, is designated route E. Cylindrical bore 236 is also in communication with control chamber 124 through the portion of passageway 238 (up to where passageways 240 and 242 take off at right angles to passageway 238), and through passageways 240 and 242. This route, including cylindrical bore 236, is designated route F. Passageway 240 is smaller in diameter than passageway 238, thereby having a slight orifice effect. Cylinder plug 232 is provided on its external face 234 with cylindrical bore 244. Bore 244 is screw threaded so a compressed gas source can be screw threadedly attached. Bore 244 is in communication with control chamber 124 via passageway 246. This gas route, including cylindrical bore 244, is designated route G.

Face 248 of cylinder plug 232 serves as a stop for sleeve valve 122 when sleeve valve 122 is in the nonsealing or right-hand position. The mans for sealing the attachment between elongated cylinder body member 100 and head cylinder 104 differs from FIG. 1 only in that the O-ring 110 which is located in groove 108 is physically positioned in cylinder body member 100 instead of head cylinder 104.

Control chamber 124 has a grossly smaller volume than main chamber 102 in this embodiment of the invention. In operation, compressed gas is delivered into control chamber 124 via route F from a suitable source not shown. At the same time, compressed gas is delivered into main chamber 102 via route E. Due to the physical structure of the passageways, the compressed gas is almost simultaneously delivered to control chamber 124 and to main chamber 102, so, in effect, there is a pressure buildup in both control chamber 124 and main chamber 102. Sleeve valve 122 is maintained in sealing position or forced into sealing position by a more rapid buildup of force applied from control chamber 124. Although passageway 240 restricts the entry of the compressed gas into control chamber 124 in relation to the entry of gas into main chamber 102, via passageway 238, due to the orificelike effect of passageway 240, the large volume of main chamber 102 keeps the total force applied on sleeve valve 122 from the control chamber 124 greater at any point in time during the pressure buildup phase. The greater force applied on face 172 of sleeve valve 122 holds sleeve valve 122 snugly against sleeve valve seat 134, which in turn is held snugly against cylindrical body member 100. At the desired point in time, the pressure in control chamber 124 is reduced substantially instantaneously by the substantially instantaneous liberation of gas from control chamber 124 via route G. If a dumping solenoid is utilized, it should be extremely accurate. Compressed gas is constantly fed throughout the entire operation of the seismographic device. But the gas entering into control chamber 124 via passageway 240 is not as great as the gas exiting via passageway 236 during the evacuation operation of control chamber 124. This allows sleeve valve 122 to be forced into the nonsealing position in an almost simultaneous action, coterminous with the evacuation of control chamber 124 which exposes exhaust ports 120. This permits discharge of gas through lateral exhaust ports 120 of the gas in main chamber 102. This sudden release of gas results in a pulse, that is, a sharp bang, which generates a signal in water or underground. The cycle starts again as the gas delivery to control chamber 124 was never actually stopped, only impeded, by the orifice effect of passageway 240. Therefore, as soon as the bang occurs, sleeve valve 122 is forced back into sealing position and the pressure in main chamber 102 and control chamber 124 continues to buildup. End surface 172 of sleeve valve 122 is beveled in an inwardly direction so that compressed gas can enter control chamber 124 when sleeve valve 122 is in the right-hand position.

The structure of the cartridge illustrated in FIG. 5 may be modified by placing a ball check in passageway 238 at a point beyond where passageways 240 separate off. This modification helps to prevent passage of gas from the main chamber into the control chamber during the time period when the control chamber is being evacuated. A further modification would incorporate an orifice in the compressed gasline coming from the source. The latter modification should allow the source pressure to remain on at all times, and should allow better dumping of the gas in the control chamber.

The structure of the cartridge illustrated in FIG. 6 is another embodiment of the invention, which is somewhat similar to the cartridge illustrated in FIG. 1. The cartridge in FIG. 3 differs from the embodiment in FIG. 1 in that the gas is introduced through a separate entrance directly into the main chamber 102. In this latter aspect it is very similar to the embodiment in FIG. 3. Cylinder plug 250 contains cylindrical bore 252 on its external face 254. Cylindrical bore 252 is screw threaded so a compressed gas source can be screw threadedly attached. Cylindrical bore 252 is in communication with control chamber 124 via passageways 256 and 258. This route, including cylindrical bore 252, is designated route H. Face 260 of cylinder plug 250 serves as a stop for sleeve valve 122 when sleeve valve 122 is in the nonsealing or right-hand position. In operation, the compressed gas is delivered into control chamber 102 from an outside source of compressed gas, such as the one shown in FIG. 6, which in essence is the outside delivery source described in detail in FIG. 4. By controlling the respective flow rates, the pressure buildup in control chamber 124 is faster than the pressure buildup in main chamber 102. from this point on, the operation is similar to the operation of the embodiment demonstrated in FIGS. 1 and 2. The greater force applied on inwardly beveled end 172 holds seat valve 122 snugly against sleeve valve seat 124, which in turn is held snugly against cylindrical body member 100. At the desired point in time, gas is instantaneously released from control chamber 124 via route H, thereby substantially reducing the pressure in control chamber 124. This allows seat valve 122 to instantaneously slide to the right, that is, into the nonsealing position, thereby exposing lateral exhaust ports 120. This permits an instantaneous discharge to the atmosphere of the gas in main chamber 102. This sudden release of gas results in a pulse, that is, sharp bang, which generates a signal in water or underground. The cycle starts again by the delivery of gas to control chamber 124, thereby moving seat valve 122 into sealing position, and to main chamber 102 in the prescribed manners.

The structure of the cartridge illustrated in FIG. 7 is another embodiment of the invention. Elongated cylindrical body member 400 forms main chamber 402. Cylindrical body member 400 is screw threadedly attached at the right-hand end to cylinder cap 404, as indicated at 406. The left-hand end of cylindrical body member 400 is screw threadedly attached to cylinder body plug 408, as indicated at internal point 410. At a point on the left-hand end of cylindrical body member 400, but just to the right of internal threads 410, cylindrical body member 400 is provided with a set of external threads, as indicated at 412. Head cylinder cap 414 is screw threadedly attached to cylindrical body member 400 at 412. Head cylinder cap 414 is provided with groove 416 proximate the end screw threadedly attached to cylindrical body member 400 to accommodate a resilient sealing means such as O-ring 418 to complete the seal between cylindrical body member 400 and head cylinder cap 414. Head cylinder cap 414 is provided with cylindrical bore 420 on face 422, which is the side portion of head cylinder cap 414. Cylindrical bore 420 is screw threaded so that a compressed gas source can be screw threadedly attached. Cylindrical bore 420 is also used to facilitate removal of gas from control chamber 424. Head cylinder cap 414 is provided with cylindrical bore 426 on face 428, which is located on the left-hand side of FIG. 7, for removing gas from auxiliary chamber 430. Cylindrical bore 426 is screw threaded. Auxiliary chamber 430 consists of essentially the area enclosed within head cylinder cap 414 and head cylinder plug 408.

Head cylinder plug 408 is provided with passageways 432 to allow passage of gas from control chamber 424 into main chamber 402, although passageways 432 are small enough in diameter to have an orifice effect. Head cylinder plug 408 also contains large passageway 434 through which shaft 436 extends. The clearance of shaft 436 in passageway 434 is such as to allow passage of gas but narrow enough to have an orifice effect. Shaft 436 is part of piston means 438. At the left-hand end of shaft 436 of piston means 438 circular plate 440 is fitted upon shaft 436 in any suitable manner. Circular plate 440 has groove 442 around its circular outer face 444 in which a resilient sealing means such as O-ring 446 is placed. This O-ring arrangement facilitates movement of piston 438 during opening and closing of main chamber 402 and keeps the seepage of gas into auxiliary chamber 430 at a minimum. Valve head 448 is positioned on the right-hand end of shaft 436 and can be attached in any convenient manner. Valve head 448 is beveled on the inner or left-hand portion forming face 450. In the left-hand or sealing position face 450 of valve head 448 is seated in valve seat 452 of cylindrical body member 400. To the right of valve seat 452 but to the left of the screw threaded portion 406, cylindrical body member 400 is provided with lateral exhaust ports 454.

In operation, compressed gas is delivered into control chamber 424 via cylindrical bore 420. A portion of the compressed gas passes through orificelike passageways 432 and 434 into main chamber 402. The pressure buildup in control chamber 424 is faster than the pressure buildup in main chamber 402 due to the orifice effect of passsageways 432 and 434, thereby retaining piston 438 in the sealing position or forcing it into the sealing position. At the desired point in time, the pressure in control chamber 424 is reduced substantially instantaneously by the evacuation of gas from control chamber 424. As some gas will probably seep around O-ring 446 into auxiliary chamber 430, any gas is also evacuated from auxiliary chamber 430. It is very important to keep any substantial pressure from building up in auxiliary chamber 430. Almost simultaneously, piston 438 slides to the right exposing lateral exhaust ports 454, thereby permitting the discharge of the gas in main chamber 402. This sudden release of gas results in a pulse, that is, a sharp bang, which generates a seismic signal in water or underground. The cycle starts again by the delivery of gas to control chamber 424.

FIG. 8 shows two-way check valve 500 in the quick-exhaust position. Two-way check valve 500 keeps the amount of compressed gas passing through the solenoid to a minimum when it is placed in the compressed gaslines between the solenoid and the cartridge. The solenoid can be about 25 to 50 feet away from check valve 500, and can be less sturdily constructed when check valve 500 is used. When check valve 500 is used in a system as demonstrated in FIG. 5, it is typically attached to cylindrical bore 244 as part of the gas exhaust line, just before a solenoid valve.

Cylindrical body member 502 has cylindrical bore 504 therein extending axially from the left-hand end to a point in spaced relation to the opposite end. Cylindrical bore 504 is internally threaded at 506. The right-hand end of cylindrical bore 504 continues axially as cylindrical bore 508 which has a smaller diameter. Surface 510 forms what remains of the right-hand end wall of cylindrical bore 508. The right-hand end of cylindrical bore 508 continues axially as cylindrical bore 512 which extends entirely through the remainder of the right-hand side of cylindrical body member 502. Cylindrical body member 502 is externally threaded at 514. The right-hand end of check valve 500 can be attached to a solenoid valve, or directly to a high-pressure compressed gasline, and is the source end for the compressed gas when used in the latter manner. Cylindrical body member 502 has radial apertures 516 which are in communication with chamber 518, which is formed when seat 520 is screw threadedly attached to cylindrical body member 502 at 506. It should be understood that the capacity of the radial apertures 516 will be proportioned to facilitate almost instantaneous exhausting of the compressed gas. Surface 522 forms what remains of the right-hand end wall of cylindrical bore 508. Seat 520 has a cylindrical bore 524 therein extending axially from the left-hand end to a point in spaced relation to the opposite end. Cylindrical bore 524 is internally threaded at 526. The right-hand end of cylindrical bore 524 continues axially as bore 528, which has the shape of a regular truncated cone. Surface 530 forms what remains of the right-hand end wall of cylindrical bore 524, and serves as a stop when an acoustic generator or pipe is screw threadedly inserted into bore 524. Piston valve 532 is slidably mounted within bores 504 and 508 and is in sealing engagement with cylindrical body member 502 by means of resilient O-ring 534 mounted in groove 536. Piston valve 532 has cylindrical bore 538 therein extending axially from the left-hand end to a point in spaced relation to the opposite end. The right-hand end of cylindrical bore 538 continues as cylindrical bore 540, which has a smaller diameter, to a point in spaced relation to he opposite end. Piston valve 532 has radial apertures 542 which are in communication with cylindrical bore 540. The right-hand end of piston valve 532 is in contact with surface 522 of cylindrical body member 502 in a metal-to-metal seal, when piston valve 532 is in the exhaust position, and can have any desired configuration as long as said seal is accomplished. The outer portion 544 of piston valve 532 has a smaller diameter than the rest of piston valve 532, whereby chamber 546 is formed. The left-hand end of piston valve 532 is in the form of a modified knife edge 548. It will be readily appreciated that the terminal portion 548 of piston valve 532 can assume any desired configuration to provide a metal-to-metal seal between piston valve 532 and seat 520. When piston valve 532 is in the extreme left-hand position, knife edge 548 is in a sealing position by means of metal-to-metal contact with right-hand end of seat 520. Ball valve 550 is normally urged against valve seat 552 by helical spring 554.

In operation, compressed gas is introduced into bore 512 whereby piston valve 532 is forced into the extreme left-hand position blocking the passage of any gas into chamber 518. The compressed gas passes on into chamber 546, which is now exposed to bore 512, then into radial apertures 542, and then into bore 540, whereby ball valve 550 is forced to the left or nonsealing position and the compressed gas can pass into bore 538 and subsequently on into the acoustic generator. At the desired interval in time, the pressure on the compressed gas side is suddenly reduced. Ball valve 550 seats in valve seat 552 and piston valve 532 is forced to the extreme right-hand or quick-exhaust position. The compressed gas from the control chamber in the acoustic generator almost instantaneously exhausts through chamber 518, which is now in communication with the passageway in seat 520, and out radial apertures 516 to the atmosphere. The cycle starts again when compressed gas is again introduced into bore 512.

Figure 9:
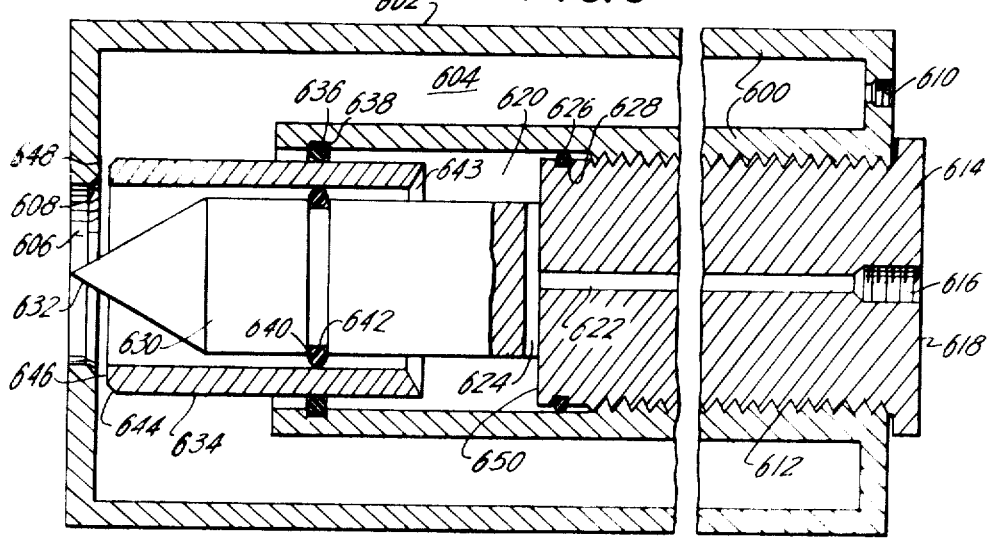
FIG. 9 is a longitudinal sectional view of a device illustrating another embodiment of this invention.

The structure of the cartridge illustrated in FIG. 9 is another embodiment of the invention. The U-shaped portion 600 of cylindrical body 602 forms the main chamber 604. Cylindrical body 602 on its left-hand face contains aperture 606. Aperture 606 is beveled on its internal edge to form slanted surface 608. Cylindrical body 602 on its right-hand face contains bore 610 through which compressed gas is fed into the main chamber. In the canter portion of U-shaped part 600 of cylindrical body 602 the internal facings are supplied with screw threads 612. End plug 614 is screw threadedly inserted in to the right-hand end of cylindrical body 602, fitting into screw-threaded portion 612. End plug 614 contains bore 616 on its right-hand face 618. Control chamber 620 is formed in that portion bounded by the left-hand end of end plug 614 and the internal facings of U-shaped part 600 of cylindrical body 602. Bore 616 is in communication with control chamber 620 through passageways 622 and 624, which represent, including bore 616, route J. The joint between end plug 614 and the inner portion of cylindrical body 602 is sealed by means of resilient O-ring 626 which is positioned in groove 628 in end plug 614. The left-hand end of end plug 614 is elongated shaft 630 which terminates in tapered end 632. For any given design of tapered end 632, the sound or shock wave will have a certain frequency or number of frequencies. It is probable that the frequency can be changed by the angle of the bevel, or fluting, e.g., spirally fluting, or serrating. Tapered end 632 is not essential for the obtaining of the directional assistance as this can be accomplished through the seat and valve design. Sleeve valve 634 is slidedly mounted with control chamber 620 between O-ring 636 in groove 638 of the inner portion of cylindrical body 602 and O-ring 640 in groove 642 of end plug 614. The right-hand end of sleeve valve 640 is beveled with an internal slant to form face 643 and the left-hand end of sleeve valve 634 is beveled slanting outwardly to form face 644. In the sealing or left-hand position face 646 of sleeve valve 634 is seated against internal face 648 of the left-hand end of cylindrical body 602 to provide a metal-to-metal seal. In the right-hand or nonsealing position face 650 of the central part of end plug 614 serves as a stop for sleeve valve 634.

In operation, compressed gas is delivered into control chamber 620 via route J and into main chamber 604 via bore 610. By the use of a three-way solenoid or equivalent device, the pressure buildup in control chamber 620 is faster than the pressure buildup in main chamber 604. This forces sleeve valve 634 into the left-hand or sealing position. At a certain point in time, the gas in control chamber 620 is evacuated rapidly via route J, thereby causing sleeve valve 634 to be moved rapidly into the nonsealing position due to the force applied on face 644 of sleeve valve 634. The gas in main chamber 604 is liberated substantially instantaneously and its sudden release results in a pulse, that is, a sharp bang, which generates a seismic signal in water or underground. Due to the physical arrangement of the acoustical generator illustrated in FIG. 9 the seismic signal or pulse is a directional one aimed in the direction substantially represented as a line traversing the longitudinal axis of the acoustical generator in FIG. 9 in a left-hand direction. This directional signal has many advantages in seismic work. To start the cycle again, compressed gas is delivered to control chamber 620 so that the pressure buildup is faster in control chamber 620 than in main chamber 604.

Figure 10:
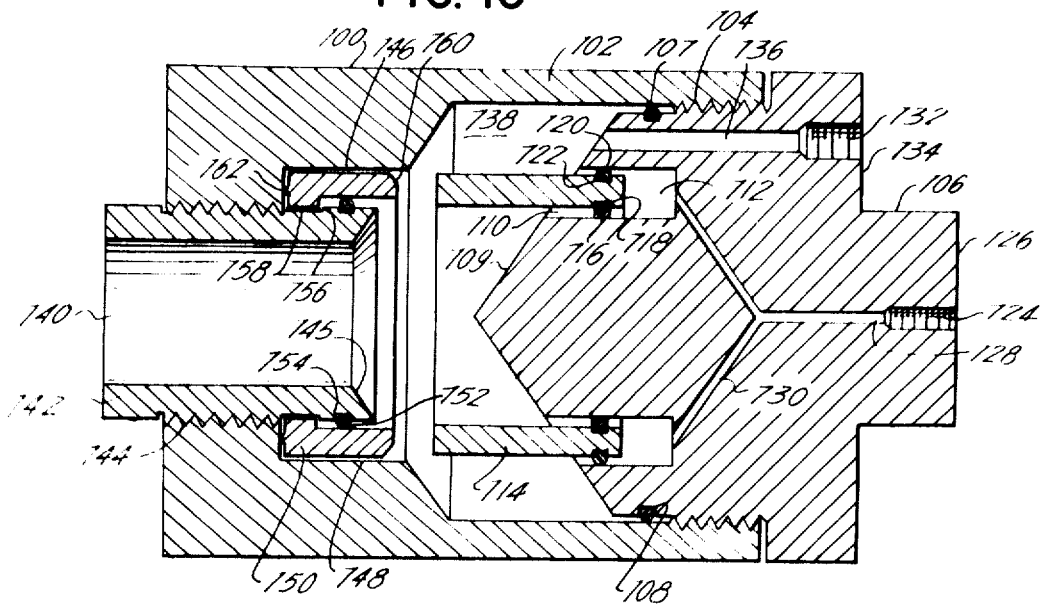
FIG. 10 is a longitudinal sectional view of a device illustrating another embodiment of this invention.

The structure of the cartridge illustrated in FIG. 10 is another embodiment of the invention, which is very similar to the embodiment of the invention illustrated in FIG. 9 except that this embodiment is especially designed to facilitate rapid opening of the exhaust port to achieve better control or faster response in the demand for a seismic pulse. This embodiment is also designed to facilitate more control, in the directional sense, of the seismic pulse. FIG. 10 represents the embodiment of the invention which is conceived to be the best mode. Cylindrical body 700 is provided with elongated portion 702, which forms a cup on the right-hand side of cylindrical body 700. The interior wall of the cup formed by elongated portion 702 is screw threaded at the right-hand extremity indicated as 704. End plug 706 is screw threadedly inserted into the cup portion of cylindrical body 700 at 704. The joint between cylindrical body 700 and end plug 706 is sealed by means of resilient O-ring 707 positioned in groove 708 in end plug 706. The left-hand end of end plug 706 is tapered as indicated at 709. Tapered left-hand end 709 of end plug 706 contains circular groove 710 which forms control chamber 712 when sleeve valve 714 is inserted into circular groove 710. Sleeve valve 714 is slidably mounted in circular groove 710 between O-ring 716, which is located in groove 718 of sleeve valve 714, and O-ring 720, which is located in groove 722 of sleeve valve 714. Bore 724 is located on the right-hand end of end plug 706 on face 726. Bore 724 is in communication with control chamber 712 via passageways 728 and 730. This route, including bore 724, is designated route K. Bore 732 which is located on the right-hand end of plug 706 on face 734 is in communication with the lower end of the cup formed by elongated portion 702 of cylindrical body 700 via passageway 736. This route, including bore 732, is designated route L. That portion of the cup formed when end plug 706 is inserted in cylindrical body 700 comprises main chamber 738. The left-hand end of cylindrical body 700 contains exhaust port 740. Exhaust port 740 is constructed from the insertion of tube 742 into a slightly wider aperture in the left-hand end of cylindrical body 700. The sealing means can be screw-threaded means, such as indicated at 744. Right-hand end 745 of tube 742 is beveled on an inward slant to facilitate the directional flow during release of the gas from main chamber 738. The end of the cup portion of cylindrical body 700 is also slanted inwardly toward exhaust port 740 to facilitate the directional flow during exhausting. Groove 746 is formed on the one side by tube 742 and on the other side by wall 748 of cylindrical body 700. Sleeve valve seat 750 is slidably mounted in groove 746 by means of resilient O-ring 752 which is located in groove 754 of tube 742. Lip 756 of tube 742 serves as a stop for lip 758 of sleeve valve seat 750. Sleeve valve seat 750 is beveled on its right-hand end on the outward edge so as to form surface 760. The left-hand end of sleeve valve seat 750 contains ridge 762.

In operation, compressed gas is delivered to control chamber 712 via route K and to main chamber 738 via route L. The pressure buildup is controlled by suitable means so that the pressure at any given time during buildup is greater is control chamber 712. This causes sleeve valve 714 to be forced into the sealing position, which is in metal-to-metal contact with the right-hand end of sleeve valve seat 750. In turn, sleeve valve seat 750 is forced into the left-hand position, with ridge 762 holding the left-hand end of sleeve valve seat 750 generally away from the left-hand end of groove 746. O-ring 752 aids sealing by preventing gas from escaping through that portion of the sealing means. At the desired point in time, the pressure in control chamber 712 is reduced substantially instantaneously by the evacuation of the gas from control chamber 712. Almost simultaneously, sleeve valve 714 and sleeve valve 746 move to the right. Sleeve valve seat 750 is moved to the right only as far as stop 756 will allow movement. Sleeve valve seat 750 is moved due to the fact that rim 762 allows the compressed gas into the space at the left-hand end of groove 746. This serves as an additional force to facilitate rapid opening of the exhaust port 740 by moving sleeve valve 714 rapidly into the nonsealing position. After the movement of sleeve valve seat 750 is stopped by stop 756, sleeve valve 714 continues its movement into control chamber 712. The gas in main chamber 738 instantly exhausts through exhaust port 740 in a directional manner as controlled by the physical arrangement of that portion of the acoustical generator. The cycle is started again by delivery of compressed gas to control chamber 712.

FIG. 11 illustrates another embodiment of the apparatus for use in the present invention which includes an elongated cylindrical body member 800 forming main chamber 802. The end of cylindrical body member 800 remote from the gas inlet 804 is screw threadedly attached to cylinder plug 806 as indicated at 808. Cylinder plug 806 is provided with groove 810 proximate the end towards cylindrical body 800 to accommodate a resilient sealing means such as O-ring 812 to complete the seal between cylinder plug 806 and cylindrical body 800. Cylinder plug 806 in turn is screw threadedly attached as indicated at 814 to discharge head assembly 816. The end of discharge head assembly 816 remote from cylinder plug 806 has an internally threaded portion 818 by means of which it is connected to solenoid valve arrangement 820. Solenoid valve arrangement 820 can be electrically or pneumatically controlled, or by any other suitable means. Electrical control is preferred as it results in faster and more accurate control.

Cylindrical body member 800 is provided with a plurality of lateral exhaust ports 822 which are normally spanned and closed by sleeve valve 824, the seal being completed by resilient O-ring 826 in groove 828 of cylindrical body member 800. Sleeve valve seat 830 is slidably mounted within cylindrical body member 800 and is in sealing engagement with cylindrical body member 800 by means of resilient O-ring 832 mounted in groove 834. The end of sleeve valve seat 830 in contact with sleeve valve 824 is in the form of a modified knife edge 835. It will be readily appreciated that the terminal portion 835 of sleeve valve seat 830 can assume any desired configuration to provide a metal-to-metal seal between sleeve valve 824 and sleeve valve sent 830. Sleeve valve seat 830 is kept from moving to the left beyond a predetermined point by ridge 836 of cylindrical body member 800 and from moving to the right beyond a predetermined point by rim 837. Ridge 836, when sleeves valve seat 830 is in the extreme left-hand position, serves to reduce the effective cross-sectional area upon which the pressure in main chamber 802 can act.

Control piston 838 is mounted within sleeve valve 824 with sufficient space 840 between them to permit flow of compressed gas around control piston 838 through passageways 842 into chamber 844, which runs lengthwise of control piston 838. Sleeve valve 824 is welded to angular flange 846 of control piston 838 at interface 848 in an airtight manner. Plug 850 is screw threadedly attached to control piston 838 at 852, which is in chamber 844. Chamber 844 is in communication with secondary or control chamber 854 through passageways 856.

Stem 858 is seated metal to metal on the left-hand face of solenoid valve arrangement 820 at 860. The surfaces forming the interfacing at 860 can e welded together to prevent slippage of stem 858. Stem 858 fits through hole 862 in the center portion of discharge head assembly 816 which is provided with groove 864 to accommodate O-ring 866 to complete a very tight seal between stem 858 and discharge head assembly 816. Stem 858 fits through hole 868 in the center portion of cylinder plug 806 which is provided with groove 870 to accommodate O-ring 872 to complete a very tight seal between stem 858 and cylinder plug 806. Also, stem 858 is slidably mounted in the right- hand end of chamber 844 of control piston 838 by means of O-ring 874 which is mounted in groove 876. Stem 858 has cylindrical bore 878 forming an axially oriented passageway through its length and has end apertures 880 on its left-hand end which are in communication with chamber 844.

Solenoid valve arrangement 820 has cylindrical bore 882 therein extending axially from the left-hand end to a point in spaced relation to the opposite end. The right-hand end of cylindrical bore 882 continues as chamber 884, which is wider than cylindrical bore 882. The right-hand end of chamber 884 continues axially as bore 886. Plunger 888 is slidably mounted in bore 886 to form a seal, by means of O-ring 890 which is mounted in groove 892. Plunger 888 is constructed of a suitable material, such as, a soft iron. Plunger 888 is fitted with cylindrical ring 894 which is slidably mounted in chamber 884, to form a seal, by mans of O-ring 896 which is mounted in groove 898. The left-hand end of plunger 888 terminates in tapered end 900. Tapered end 900 should have a harder surface than the rest of plunger 888, which can be accomplished in any suitable manner, e.g., case hardening, capping with a hard alloy. When plunger 888 is in the left-hand position, as illustrated in FIG. 11 tapered end 900 seats against rim 902, which is formed by the intersection of bore 882 and chamber 884, forming a metal-to-metal seal. Bore 882 is in communication with chamber 884 by means of passageway 903. The movement of plunger 888 is accomplished and controlled by use of solenoid 904, and shield 906 encloses solenoid 904 in a manner which allows the necessary movement of plunger 888 during operation. When plunger 888 is in the right-hand position within chamber 884. The compressed gas can exhaust to the atmosphere from the control portion of the system by passing out passageway 908, which connects chamber 884 with discharge space 910, which in turn vents to the atmosphere. It is to be understood that atmosphere means any liquid or gaseous medium, e.g., water, air. Discharge passageway 910 is formed by cylindrical lateral extension 912 of discharge head assembly 816.

In operation, compressed gas is introduced into main chamber 802 from a compressed gas source through gas inlet 804. The compressed gas enters control chamber 854 from the main chamber by passing through annular space 840 about the periphery of the control piston 838, and by means of passageways 842, chamber 844 and passageways 856, in order. This route is designated route M. The size of the passageways, etc., in route M are designed so that the pressure in main chamber 802 and control chamber 854 is not too different during the charging of the cartridge. Moreover, since the effective cross-sectional area of the right-hand side (or control chamber side) of piston valve 838 when in the sealing position is larger than that of the left-hand side (or main chamber side) of piston valve 838, sleeve valve seat 830, an sleeve valve 824, the effective force that is applied from the right-hand side is greater even when the pressure in the control chamber is somewhat less than the pressure in the main chamber. In view of this, it is seen that piston valve 838, etc., can be kept in such a position during the filling of the cartridge so that lateral exhaust ports 822 remain closed. The pressure in chambers 802 and 854 tends to equalize as the filling reaches its climax.

Control chamber 854 is in communication with the atmosphere through passageways 856, chamber 844, cylindrical bore 878, cylindrical bore 882, the portion of chamber 884 to the left of cylindrical ring 894, passageway 908 and discharge space 910. This route is designated route N. At the desired point in time, the pressure in control chamber 854 is reduced substantially instantaneously by the substantially instantaneous liberation of the gas from control chamber 854 via route N. The discharge of control chamber 854 is accomplished by using solenoid 904 which causes plunger 888 to move to the right. This unseats tapered end 900 which in turn allows the compressed gas to flow through passageway 908 and subsequently to exhaust to the atmosphere. The rapid reduction of pressure in control chamber 854 causes piston valve 838, consequently sleeve valve 824, and sleeve valve seat 830, to rapidly slide to the right into control chamber 854. This movement exposes lateral exhaust ports 822 and permits the discharge of the compressed gas in main chamber 802. The gas in main chamber 802 has moved sleeve valve seat 830 to the right but it is quickly stopped in its movements when lip 914 of sleeve valve seat 830 contacts with rim 837 of cylindrical body member 800. The gas is liberated substantially instantaneously and its sudden release results in a pulse which generates a seismic signal in the water or underground. When the residual pressure in main chamber 802 reaches a certain level, the residual pressure in control chamber 854 tends to force sleeve valve 824 (and consequently piston valve 838) to the left whereby lateral exhaust ports 822 are sealed off by closing sleeve valve 824. To start the cycle over again, compressed gas is delivered into the cartridge.

In FIG. 12 acoustic generator 1000 embodying the invention is illustrated and, as shown in the drawing, is immersed into a body of water 1002 at the earth's surface. Acoustic generator 1000 is screw threadedly attached to quick-exhaust valve 1004 (which can be the two-way check valve shown in FIG. 8), which, in turn, is screw threadedly attached to three-way solenoid valve 1006. Solenoid valve 1006 is connected to beat 1008 by a cable which has attached a compressed gasline 1010. Boat 908 carries compressors 1010, e.g., commercially available compressors capable of compressing approximately 90 cubic feet of free air to 12,000 p.s.i.g. per minute, for filling the cartridges of the present invention. The body of water 1002 forms a coupling medium between the acoustic generator 1000 and the earth. As acoustic generator 1000 produces pulses of energy by the release of compressed gas in the manner hereinabove explained, seismic waves traveling along paths as indicated by the arrow 1012 are generated and reflected by subsurface bed 1014 along paths 1016 to actuate seismic detectors 1018 which may also be carried by the boat, or, if desired, located on land near the generator, or carried on a separate boat. The outputs signals from seismic detectors 1018 are applied to a conventional recorder which produces a time-amplitude record thereof for seismic study. Preferably the seismic surveying is continuously conducted by repeated actuation of source 1000 while the boat is under way. When solenoid 1006 is located close to acoustic generator 1000, there is very short time lag in response to a command signal from boat 1008 due to a delay in response by solenoid 1006. The various lag times can be predetermined and used to adjust the expected point in time for creation of a seismic signal. The records obtained, in accordance with the present invention, reveal the character of the subsurface reflecting beds.

In FIG. 13 several acoustic generators 1050 embodying the invention are positioned underground in holes 1052, which have been prepared in any suitable manner, e.g., drilling, and set up in a manner appropriate for sequential firing. Acoustic generators 1054 are screw threadedly attached to quick exhausting valves 1050, which, in turn, are connected to three-way solenoid valves 1056 by cables which have attached compressed gaslines 1058. Solenoid valves 1056 are connected to compressor 1060 by cables which have attached compressed gaslines 1062. The setup in FIG. 13 allows a sequential firing of acoustic generators 1050, each positioned in a separate location, while utilizing only one compressor.

Figure 15:
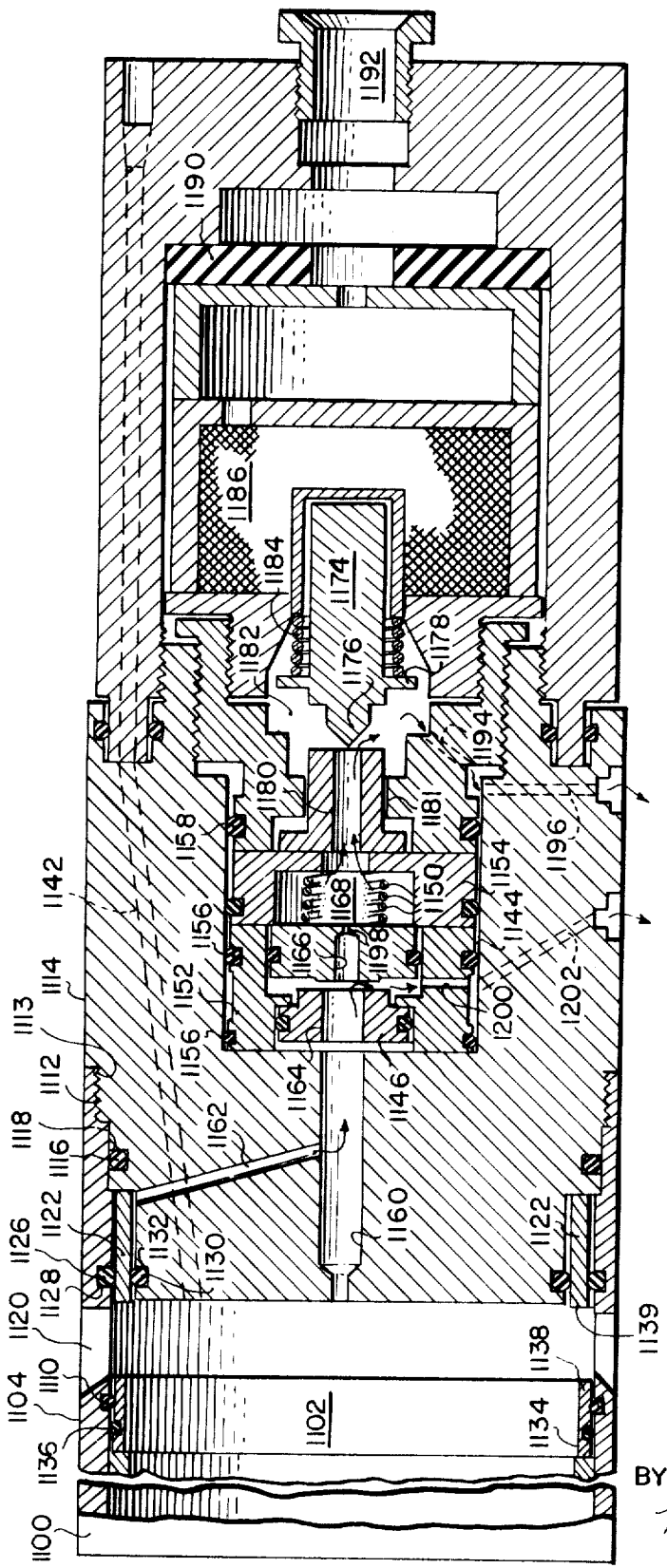
FIG. 15 is a longitudinal sectional view similar to FIG. 14 except the sleeve valve is in open position.
Figure 14:
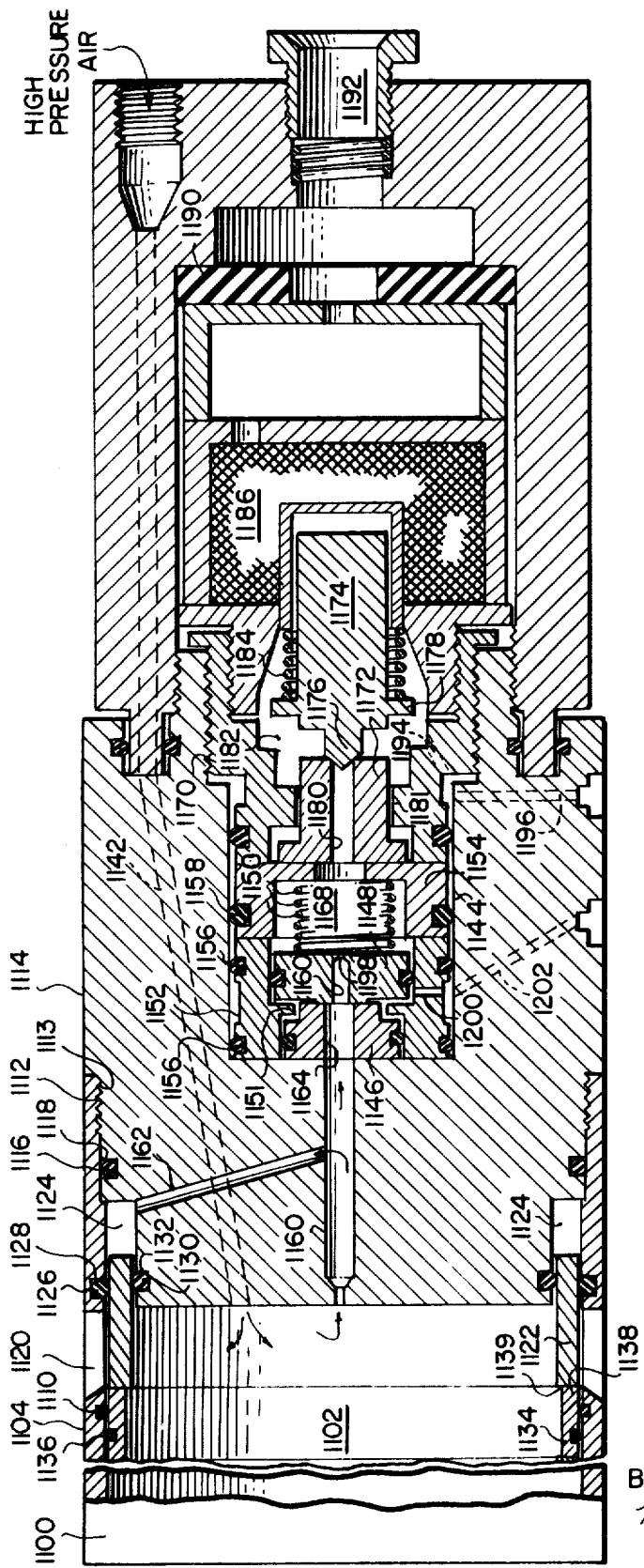
FIG. 14 is a longitudinal sectional view of a preferred device illustrating an embodiment of this invention wherein the sleeve valve is in closed position.

Referring now to FIGS. 14 and 15, which describe another embodiment of this invention, this embodiment is designed to effectuate discharge of the compressed air in main chamber 1102 very quickly by controlling discharge of this chamber upon the discharge of a much smaller volume of compressed air. In this embodiment, reference numerals have been applied to elements similar to those of the previous FIGS. by affixing the numeral 1 in advance of the numerals used in FIG. 1 whereby the main chamber in FIGS. 14 and 15 is designated as numeral 1102 and in FIG. 1 as numeral 102. Operation of sleeve valve 1122 is effected, in a manner similar to that described in FIG. 1 by a reduction in the pressure within control chamber 1124 and sleeve valve 1122 and sleeve valve seat 1134 are similar to those described with reference to FIG. 1.

Reduction in the pressure within control chamber 1124 is effected while high-pressure air is continuously being supplied to the main chamber 1102 through passage 1142 as shown by the arrows in FIG. 14. This reduction in pressure is accomplished by the valve arrangement in bore 1144 within cylinder plug 1114, which valve arrangement includes valve seat 1146, valve element 1148 and valve spring 1150. The valve seat, valve element and spring are retained within valve and seat housing 1152 and spring cage 1154. Housing 1152 is sealed within bore 1144 by O-rings 1156 and spring cage 1154 is sealed by O-ring 1158. As described below, valve seat 1146 and valve element 1148 each have limited freedom of movement within housing 1152 and are sealed by a metal-to-metal seal at surfaces 1147 and 1149, see FIG. 15. Compressed air can pass from the main chamber 1102 through passages 1160 and 1162 in cylinder plug 1114 to chamber 1124. Similarly, passages 1164 and 1166, respectively, in valve seat 1146 and valve element 1148 allow the compressed air into chamber 1168 behind the valve element. Passage 1166 is smaller than passage 1164 so that surface 1149 is acted upon by the compressed air. Also, passage 1166 is connected to chamber 1168 by a reduced orifice 1198. The pressure of the air in chamber 1168 against the rear of valve element 148 and spring 1150 normally maintain valve element 1148 and valve seat 1146 in their closed position, as shown in FIG. 14, that is, with surfaces 1147 and 1149 in their metal-to-metal seal. Adapter element 1170 holds spring cage 1154 and housing 1152 against the inner wall of bore 1144 and serves an an adapter for solenoid valve seat 1172 which is free to move within the passage 1181 connecting the forward or left-hand portion of adapter 1170 and chamber 1182 of the adapter. Solenoid valve element 1174 includes a narrowed forward portion 1176 which seats within the bore 1180 interconnecting chamber 1168 and chamber 1182 and a main body portion 1178 within the solenoid coil 1186. Solenoid valve spring 1184 normally maintains solenoid valve element 1174 in a position such that portion 1176 closes passage 1180. The solenoid valve is adapted to be opened by excitation of solenoid coil 1186 contained within the solenoid housing, as shown, which includes a rubber mounting element 1190. The necessary electrical wiring can enter through passage 1192. Since the solenoid valve is normally held closed by spring 1184 and a metal-to-metal seal exists between the valve seat 1146 and valve element 1148, due, respectively to springs 1184 and 1150, the system, that is, main chamber 1102, is normally sealed. Upon introduction of air into main chamber 1102, the air enters chamber 1168 through passages 1164 and 1166. This also applies the air pressure against the solenoid valve element 1176. Solenoid spring 1184 is chosen to hold a predetermined desired pressure within chamber 1168.

With the system at a desired pressure, release of the air in chamber 1102 is effected. To accomplish this, solenoid valve coil 1186 is energized which causes solenoid valve element 1174 to suddenly move portion 1176 off solenoid valve seat 1172 and exhaust air from chamber 1168 throughpassage 1194 in solenoid adapter 1170. This relatively small amount of air is exhausted through passage 1196 in cylinder plug 1114, as shown by the arrows in FIG. 15. It should be noted it is not necessary to exhaust all of the air in chamber 1168 but only a small portion thereof which reduces the pressure on the right-hand face of the valve element 1148 to such a point that the force applied against this face is less than the force applied to face 1149 and orifice 1198 walls which tend to move valve element 1148 to the right. The force tending to move valve element 1148 to the right is the area of the valve element exposed to the air pressure in chamber 1102 multiplied by the pressure. Additionally, if additional force on valve element 1148 is desired, passage 1164 can be made smaller than passage 1160 so that valve seat 1146 applies force against valve element 1148. Movement of valve seat 1146 is limited by flange 1151 on housing 1152. When valve element 1148 is moved to the right, the metal-to-metal seal between faces 1147 and 1149 is broken to thereby exhaust the relatively large quantity of air held within control chamber 1124. This air exhausts between the valve seat and valve element through passage 1200 in housing 1152, as shown by the arrows in FIG. 15 and through passage 1202 in cylinder plug 1114. As described above with respect to the additional embodiments of this invention, reduction of the pressure in control chamber 1124 effects discharge of the compressed air within the main chamber 1102 through ports 1120 by movement of valve element 1122.

Table I demonstrates the response time between when a typical system of this invention was instructed to fire and when the cartridge actually fired. The acoustic generator was similar to the one illustrated in FIG. 1, and the two-way check valve was similar to the one illustrated in FIG. 8, and was directly attached to the acoustic generator. The solenoid valve was placed in the compressed air line between the two-way check valve and the compressed gas source. Shots 1 through 10 were made in sequence at a pressure of about 10,500 p.s.i. with the solenoid valve placed 25 feet from the cartridge. The response time was 465±5 milliseconds, so as response time consistency of ±5 milliseconds was achieved. Shots 11 through 18 were identical to the prior group of shots except that the pressure was about 8,000 p.s.i. The response time was 499±6 milliseconds, so a response time consistency of ±5 milliseconds was achieved. Shots 19 through 28 were made at a pressure of about 8,000 p.s.i., with the solenoid valve placed 5 feet from the cartridge, but the two-way check valve was removed from the system. The response time was 210±4 milliseconds, so a consistency of ±4 milliseconds was obtained. Shots 29 through 40 were identical to the immediately preceding group of shots except that the pressure was about 10,000 p.s.i. The response time was 206±6 milliseconds, so a response time consistency of ±6 milliseconds was obtained. In all of the above tests the response time consistency was ±6 milliseconds or less. Some of the inaccuracies resulted from a solenoid valve that was only accurate to within about ±3 milliseconds and which took about 100 p.s.i. to actuate, and from a possible variation of about ±1.5 milliseconds due to the use of AC current.

When the acoustic generators of this invention are to be used underwater, the acoustic generators preferably should be pressurized before immersion. This procedure helps to ensure that water will not enter or seep into the interior portions of the acoustic generators.

TABLE I

| Shot No. | Pressure before venting (p.s.i.) | Response time (msec.) | Distance of solenoid valve to cartridge (ft.) | Two-way check valve in-line |
|---|---|---|---|---|
| 1 | 10,400 | 470 | 25 | Yes. |
| 2 | 10,400 | 467 | 25 | Yes. |
| 3 | 10,600 | 463 | 25 | Yes. |
| 4 | 10,600 | 460 | 25 | Yes. |
| 5 | 10,600 | 464 | 25 | Yes. |
| 6 | 10,700 | 467 | 25 | Yes. |
| 7 | 10,700 | 461 | 25 | Yes. |
| 8 | 10,600 | 465 | 25 | Yes. |
| 9 | 10,600 | 460 | 25 | Yes. |
| 10 | 10,600 | 465 | 25 | Yes. |
| 11 | 8,000 | 505 | 25 | Yes. |
| 12 | 8,000 | 505 | 25 | Yes. |
| 13 | 8,000 | 500 | 25 | Yes. |
| 14 | 8,000 | 496 | 25 | Yes. |
| 15 | 8,000 | 500 | 25 | Yes. |
| 16 | 8,000 | 493 | 25 | Yes. |
| 17 | 8,000 | 495 | 25 | Yes. |
| 18 | 8,000 | 500 | 25 | Yes. |
| 19 | 8,000 | 211 | 5 | No. |
| 20 | 8,000 | 211 | 5 | No. |
| 21 | 8,000 | 206 | 5 | No. |
| 22 | 8,000 | 207 | 5 | No. |
| 23 | 8,000 | 212 | 5 | No. |
| 24 | 8,000 | 207 | 5 | No. |
| 25 | 8,000 | 210 | 5 | No. |
| 26 | 8,000 | 209 | 5 | No. |
| 27 | 8,000 | 214 | 5 | No. |
| 28 | 8,000 | 212 | 5 | No. |
| 29 | 10,000 | 200 | 5 | No. |
| 30 | 10,000 | 203 | 5 | No. |
| 31 | 10,000 | 207 | 5 | No. |
| 32 | 10,000 | 210 | 5 | No. |
| 33 | 10,000 | 210 | 5 | No. |
| 34 | 10,000 | 205 | 5 | No. |
| 35 | 10,000 | 205 | 5 | No. |
| 36 | 10,000 | 203 | 5 | No. |
| 37 | 10,000 | 208 | 5 | No. |
| 38 | 10,000 | 205 | 5 | No. |
| 39 | 10,000 | 212 | 5 | No. |
| 40 | 10,000 | 206 | 5 | No. |

The commercial geophysical prospecting systems presently in use (except the vibrating type) depend for the seismic signal or sound wave upon the discharge of creation of gas at high pressure, for example, by means of an explosion. When this occurs underwater or in marshy areas, the released gas forms a bubble or void and as the energy of the expanding gas is dissipated or expended, the bubble collapses, the water rushes back to fill the void, and a second shock wave closely following the seismic signal is thereby produced. This second shock wave interferes with the reflection and recording of the reflection of the seismic signal and, although the second shock wave can be filtered out, the resulting record suffers.

One of the principal advantages of the seismic signal generating device of the present invention is its capability of substantially reducing the amplitude of the second shock wave relative the seismic signal. Thus, for example, the embodiment of FIG. 14 can be operated at a discharge pressure of 8,000 p.s.i.a., the solenoid can be energized for a period of about 50 to 70 milliseconds permitting the pressure in the device to decrease to about 1,000 to 1,500 p.s.i.a. It has been noted that when operated in this manner, the amplitude in decibels of the second shock wave is approximately 60 percent of the amplitude in decibels of the seismic signal.

In order to illustrate this effect, 31 seismic tracings were made using an embodiment of FIG. 14 having a 36-inch-long air chamber with a volume of 128 cubic inches pressure to 8,000 p.s.i. and discharged 15 feet below water level. Certain pertinent features taken from these tracings are tabulated below. In the table, the lag is the time elapsed in milliseconds between the time the solenoid was energized and the time the gun fired; the pulse is the time in milliseconds the solenoid was energized, RP is the remaining pressure or the pressure of the air left in the gun after discharge, and the amplitudes are those of the peak of the first and second shots in decibels.

TABLE I

| Lag | Pulse | RP | 1st amp. | 2nd amp. |
|---|---|---|---|---|
| 28 | 38 | 2100 | 23 | 20 |
| 28 | 31 | 2150 | 23 | 20 |
| 28 | 31 | 2175 | 23 | 20 |
| 29 | 32 | 2200 | 23 | 20 |
| 28 | 87 | 1000 | 23 | 14 |
| 28 | 118 | 700 | 23.5 | 14 |
| 28 | 118 | 700 | 23.5 | 15 |
| 28 | 170 | 700 | 23.5 | 14.5 |
| 28 | 135 | 700 | 23.5 | 14 |
| 28 | 72 | 1200 | 23.5 | 14.5 |
| 28 | 60 | 1400 | 23.5 | 15 |
| 28 | 26 | 2175 | 23.5 | 21 |
| 28 | 26 | 2175 | 23.5 | 21 |
| 28 | 26 | 2175 | 23.5 | 21 |
| 26 | 20 | 3000 | 23 | 21 |
| 25 | 52 | 1700 | 23 | 15 |
| 26 | 36 | 2600 | 22 | 21 |
| 25 | 42 | 2200 | 22 | 18 |
| 25 | 47 | 1800 | 23 | 15 |
| 25 | 107 | 1300 | 23 | 13 |
| 27 | 128 | 1000 | 23 | 14 |
| 25 | 107 | 1200 | 23 | 13 |
| 28 | 20 | 4500 | 23 | 20 |
| 27 | 37 | 4100 | 23 | 18 |
| 27 | 52 | 3600 | 23 | 15 |
| 26 | 37 | 6400 | 23 | 21 |
| 26 | 32 | 5600 | 23 | 21 |
| 33 | 50 | 5600 | 23 | 21 |
| 26 | 50 | 4900 | 22 | 16 |
| 26 | 50 | 4900 | 22 | 20 |
| 27 | 20 | — | 22 | 20 |

In additional tests, several identical embodiments of FIG. 14 were discharged simultaneously under 15 feet of water, the embodiments being separated horizontally 40 to 60 inches. The embodiments each had a 36-inch-long air chamber with a volume of 128 cubic inches pressured to 8,000 p.s.i. The results are tabulated below under the same headings as table I except that "Number" designates the number of embodiments discharged simultaneously.

TABLE II

| Number | Lag | Pulse | RP | 1st amp. | 2nd amp. |
|---|---|---|---|---|---|
| 2 | 27 | 51 | 1000 | 25 | 10 |
| 2 | 26 | 20 | 2400 | 25 | 19 |
| 2 | 27 | 20 | 2300 | 25 | 20 |
| 2 | 28 | 53 | 1000 | 25 | 14 |
| 3 | 27 | 25 |  | 26.5 | 19.5 |
| 3 | 27 | 25 |  | 26 | 19 |
| 3 | 27 | 45 |  | 26.5 | 13 |
| 4 | 27 | 22 |  | 27 | 12 |
|  | 27 | 22 |  | 27 | 6 |
| 4 | 27 | 56 |  | 27 | 16 |
| 4 | 27 | 22 |  | 27 | 16 |
| 4 | 27 | 22 |  | 27 | 10 |

As can be seen from the above, the effect of second shock minimization is more pronounced with the number of simultaneous discharges.

Referring again to an embodiment of FIG. 14, data show that an initial seismic signal of the order of 20 27 decibels can be generated when such an embodiment is pressure to 2,000 to 8,000 p.s.i., the air chamber is 15 to 36 inches long and contains 52 to 128 cubic inches, and the solenoid is energized for about 20 milliseconds. The data in tables I and II indicate that energizing the solenoid for from 50 to 70 milliseconds permits additional lower pressure air to discharge into the void space formed by the initial rapid air discharge tending to minimize the rush back of water to fill the void and the resulting shock. It is evident, therefor, that at lower initial discharge pressures and/or with smaller air chambers, the discharge or bleeding of lower pressure air into the void will be less than with 8,000 p.s.i. air in a 128 cubic inch chamber and hence the decrease in decibels of the second shock wave will be less.

It is claimed:

1. A seismic sound wave generator system for creating sound waves forming a seismic signal which comprises a casing including a gas differential pressure system defining a main chamber and a control chamber each adapted to contain gas under pressure, the control chamber being substantially smaller in volume than the main chamber, a pressure equalizing orifice connecting the control chamber and the main chamber, at least one impulse producing exhaust portion in the main chamber, the gas differential pressure system including gas pressure responsive slidable opening and closing means for opening the impulse producing exhaust port to discharge at least one-fourth of the high-pressure gas in the main chamber within 10 milliseconds and for closing the impulse producing exhaust port, the slidable opening and closing means having opening and closing surfaces at opposite ends thereof exposed to gas pressure respectively in the main and in the control chambers, the closing surface of the opening and closing means in closed position having an effective area subject to gas pressure greater than the effective area subject to gas pressure of the opening surface, the opening and closing means being responsive to a gas pressure differential across the main and control chambers to close and remain closed at a control chamber pressure at which the force applied on the closing surface of the opening and closing means from the control chamber is equal to or greater than that applied to the opening surface of the opening and closing means from the main chamber, gas inlet means connected to at least one of the main chamber and the control chamber, secondary exhaust means in the control chamber, the gas inlet means being adapted to be connected to a high-pressure gas source, and externally controlled valve means for rapidly reducing the control chamber pressure to a predetermined pressure at which the force applied on the closing surface of the opening and closing means of the differential pressure system from the control chamber is less than that applied on the opening surface of the opening and closing means from the main chamber such that the opening and closing means rapidly opens and automatically closes.

2. The system of claim 1 wherein the valve means is a solenoid valve.

3. The system of claim 1 wherein the opening and closing means starts to exhaust the high-pressure gas in the main chamber out of the lateral exhaust ports within ±2 milliseconds of the desired release time.

4. The system of claim 3 wherein the opening and closing means discharges at least one-half of the high-pressure gas in the main chamber within 3 milliseconds.

5. The system of claim 1 wherein the opening and closing means include means for exhausting the high-pressure gas repeatedly using an interval time period of less than about 10 seconds.

6. The system of claim 5 wherein the high-pressure gas can be exhausted repeatedly using an interval time period of less than about 7 seconds.

7. The system of claim 5 wherein the opening and closing means includes means for varying at will the exhaust interval time period from an external point.

8. The system of claim 1 wherein the externally controlled valve means includes means for exhasuting the high-pressure gas from the main chamber at a pressure of from about 2,000 to about 20,000 p.s.i.a. and includes means for sealing off the main chamber at a pressure of from about 500 to about 6,000 p.s.i.a.

9. The system of claim 1 wherein the externally controlled valve means includes means for exhausting the high-pressure gas from the main chamber at a pressure of from about 5,000 to about 12,000 p.s.i.a. and includes means for sealing off the main chamber at a pressure of from about 1,500 to about 5,000 p.s.i.a.

10. The system of claim 1 including means for varying the characteristics of the sound waves.

11. The system of claim 1 including means for concentrating the sound waves in a directional manner.

12. The system of claim 1 wherein the main chamber has a volume of from about 10 to about 200 cubic inches.

13. The system of claim 1 wherein the means for supplying the high-pressure gas to the generator comprises a boat, compressor means mounted on the boat, and high-pressure gas conduit means interconnecting the compressor means with the generator, said generator being towed underwater by the boat.

14. The system of claim 13 including a plurality of generators attached to the compressor means and means for firing the generators sequentially, the generators being towed underwater by the boat.

15. The system of claim 1 wherein the means for supplying the high-pressure gas to the generator comprises compressor means and high-pressure gas conduit means interconnecting the compressor means with the generator, the generator being placed underground.

16. The system of claim 15 including a plurality of generators attached to the compressor means, and means for firing the generators sequentially, the generators being placed underground.

17. A system comprising the generator of claim 1 in combination with a quick release valve mechanism for rapidly discharging the high-pressure gas in the control chamber at a point adjacent the secondary exhaust means in the control chamber.

18. The system of claim 1 wherein the opening and closing means includes a valve element slidably mounted in the main chamber for opening and closing the exhaust ports and having a first surface exposed to the high-pressure gas in the main chamber and a second surface exposed to the high-pressure gas in the control chamber, the area of the first surface being less than the area of the second surface when the element is in a position closing the exhausts ports and no greater than the area of the second surface when the element is in a position opening the exhaust ports, the differential pressure applied to said first and second surfaces moving the valve element to open and close the exhaust ports.

19. The system of claim 18 further including a valve seat for the valve element, the valve seat being slidably mounted in the main chamber adjacent the valve element and having a third surface exposed to the high-pressure gas in the main chamber, he combined area of the third and first surfaces being no greater than the area of the second surface when the valve element is in a position closing the exhaust ports.

20. The system of claim 19 wherein the valve seat has a first lip and the wall of the main chamber has a second lip contacting the first lip to limit movement of the valve seat as the valve seat moves with the valve element towards the position in which the exhaust ports are open.

21. The system of claim 18 wherein the gas inlet means for the main chamber and the control chamber is the same and includes a single inlet to the generator and check valve means in the gas inlet means for preventing flow out of the main chamber.

22. The system of claim 18 wherein the gas inlet means for the main chamber and the control chamber includes separate inlet passages for each of the two chambers.

23. The system of claim 18 wherein there is one impulse producing exhaust port and including means for concentrating the sound waves in the direction outwardly of the exhaust port formed by said impulse producing port and said valve element, said valve element being an annular element slidably mounted to seat in one direction around the exhaust port to close the exhaust port and to seat in another direction in the control chamber, said control chamber being an annular chamber formed around a plug element, the main chamber surrounding the valve element.

24. The system of claim 23 wherein the end of the plug element extending toward the exhaust port is tapered.

25. The system of claim 23 including an annular valve seat for the annular valve element, the valve seat being slidably mounted in the main chamber adjacent the valve element and having a third surface exposed to the high-pressure gas in the main chamber, the combined area of the third and first surfaces being no greater than the area of the second surface when the valve element is in a position closing the exhaust ports, a first lip on the valve seat, and a second lip on the wall of the main chamber at the exhaust port contacting the first lip upon movement of the valve seat to limit movement of the valve seat as it moves with the valve element towards the position in which the exhaust ports are open.

26. An assembly for creating pneumatic impulses which comprises a casing including a differential pressure system defining a main chamber and control chamber adapted to contain a high-pressure gas, impulse producing exhaust ports and gas inlet means in the main chamber, the differential pressure system including an element for opening and closing the impulse producing exhaust ports responsive to the pressure differential across the main and control chambers, gas inlet and secondary exhaust means in the control chamber, the gas inlet means for the control chamber being adapted to be connected to a high-pressure gas source, the high pressure portion of the differential pressure system during filling of the assembly with high-pressure gas including the control chamber, externally controlled valve means for rapidly reducing control chamber pressure to a pressure at which the force applied on the movable element of the differential pressure system from the control chamber is less than that applied on the movable element from the main chamber, and a quick release valve mechanism for rapidly discharging the high-pressure gas in the control chamber at a point adjacent the secondary exhaust means in the control chamber which comprises (a) a casing (1) having a chamber therein with an inlet end and an outlet end, and provided with at least one exhaust port, and (2) having an inlet port and an outlet port communicating respectively with the inlet end and the outlet end for the transportation of high pressure gas; (b) a release piston for opening or closing the exhaust port (1) slidable in the chamber for controlling the exhaust port, (2) which has a passage bore, for passage therethrough of high-pressure gas from the inlet port to the outlet port of the casing chamber, which has a narrowed portion on the inlet side and which penetrates to a position in fixed relationship to the end of the release piston towards the inlet port and which branches at that point in a direction whereby the passage bore penetrates the axial wall of the release piston, (3) which has a narrowed portion on the end towards the inlet port which allows communication between the inlet port and the passage bore when the release piston is in a position exposing the inlet port, and (4) which in the exhaust port opening position seats against the inlet end of the chamber in a manner which seals the inlet port and exposes the exhaust port and which in the fill position seats against the outlet end of the chamber in a manner which allows communication between the inlet port and the outlet port; (c) a ball check in the passage bore which in the normal position seats against the narrowed portion of the passage bore; and (d) a spring (1) positioned in the passage bore with one end engaging the ball check and the other end engaging the outlet end of the chamber, and (2) which is incapable of seating the ball check against incoming pressure and sustaining the ball check in he normal position and holding the release piston in the exhaust port opening position until the incoming pressure is reduced, whereupon the spring will seat the ball check and cause the release piston to shift into the exhaust port opening position.

27. The system of claim 26 wherein the quick release valve mechanism is directly attached to the secondary exhaust means in the control chamber at the interface formed by the outer face of the casing of the assembly.

28. The system of claim 27 wherein the valve means is a solenoid valve.

29. The system of claim 28 wherein the solenoid valve is located as much as about 50 feet from the assembly for creating pneumatic impulses.

30. The system of claim 26 wherein the quick release valve mechanism is attached to the secondary exhaust means via a high-pressure gas conduit which is less than 25 feet in length.

31. The system of claim 30 wherein the valve means is a solenoid valve.

32. The system of claim 26 wherein the means for supplying the high-pressure gas to the assembly comprises a boat, compressor means mounted on the boat, and high-pressure gas conduit means interconnecting the compressor means with the assembly, said assembly being towed underwater by the boat.

33. The system of claim 32 including a plurality of assemblies attached to the compressor means, and means for firing the assemblies sequentially, the assemblies being towed underwater by the boat.

34. The system of claim 26 wherein the means for supplying the high-pressure gas to the assembly comprises compressor means, and high-pressure gas conduit means interconnecting the compressor means with the assembly, the assembly being placed underground.

35. The system of claim 34 including a plurality of assemblies attached to the compressor means, and means for firing the assemblies sequentially, the assemblies being placed underground.

36. A method for the sequential production of seismic impulses of similar character at a rapid rate under water for use in seismic exploration comprising submerging a rigid cartridge means adapted to contain a charge of compressed gas in the water, directing a gas under substantial pressure into said cartridge to provide a charge of compressed gas in the cartridge, said charge being at a pressure of from about 3,000 to about 20,000 p.s.i., thereafter suddenly releasing at least one-half of the charge of compressed gas from the cartridge in from about 0.5 to 10 the amount of gas released and the time in which said amount of gas is released being sufficient to produce a seismic impulse by the quasiexplosive effect of said sudden release, continuing to release additional gas from the cartridge in from about 10 to 200 milliseconds during an extended blow period sufficient to inhibit production of a secondary seismic impulse, the cartridge having a residual pressure of from about 500 to 6,000 p.s.i. after release of the compressed gas which residual pressure is such as automatically to close the cartridge, and directing additional gas into he cartridge while it remains submerged to provide a second charge of compressed gas and thereafter suddenly releasing the second charge of gas from the cartridge to produce an additional seismic impulse by the quasiexplosive effect of the second charge and releasing additional gas during he blow period, said additional seismic impulse being similar in character to he first produced seismic impulse.

37. A method for the sequential production of seismic impulses of similar character at a rapid rate under water for use in seismic exploration comprising submerging a rigid cartridge means adapted to contain a charge of compressed gas in the water, continuously directing a gas under substantial pressure into said cartridge to provide a charge of compressed gas in the cartridge, said charge being at a pressure of from about 3,000 to about 20,000 p.s.i., thereafter suddenly releasing at least one-half of the charge of compressed gas from the cartridge in from about 0.5 to 10 milliseconds, the amount of gas released and the time in which said amount of gas is released being sufficient to produce a seismic impulse and form a bubble of gas in the water around the cartridge by the quasiexplosive effect of said sudden release, thereafter continuing to release additional gas from the cartridge in from about 10 to 200 milliseconds during an extended blow period sufficient to inhibit bubble collapse and production of a secondary seismic impulse, the cartridge having a residual pressure of from about 500 to 6,000 p.s.i. after release of the compressed gas which residual pressure is such as automatically to close the cartridge, the release period of the compressed gas in the cartridge being correlated with the initial and residual pressure so as to maintain a differential between the magnitude of the seismic impulse and the secondary impulse created by bubble collapse while minimizing consumption of compressed gas, and continuing to direct gas into the cartridge while it remains submerged to provide a second charge of compressed gas and thereafter suddenly releasing the second charge of gas from the cartridge to produce additional seismic waves by the quasiexplosive effect of the second charge, and releasing additional gas during the blow period, said additional seismic waves being similar in character to the first produced seismic waves.

38. A seismic sound wave generator system for creating sound waves forming a seismic signal which comprises a casing including a gas differential pressure system defining a main chamber and a control chamber each adapted to contain gas under pressure, the control chamber being substantially smaller in volume than the main chamber, a pressure equalizing orifice connecting the control chamber and the main chamber, at least one impulse producing exhaust port in the main chamber, the gas differential pressure system including gas pressure responsive slidable opening and closing means for opening the impulse producing exhaust port to discharge at least one-fourth of the high-pressure gas in the main chamber within 10 milliseconds and for closing the impulse producing exhaust port, the slidable opening and closing means having opening and closing surfaces at opposite ends thereof exposed to gas pressure respectively in the main and in the control chambers, the opening surface of the slidable opening and closing means being seated in closed position such that the effective area of the opening surface in the main chamber exposed to gas pressure tending to open the opening and closing means is less than the effective area of the closing surface in the control chamber exposed to gas pressure tending to close the opening and closing means, the opening and closing means being responsive to a gas pressure differential across the main and control chambers to close and remain closed at a control chamber pressure at which the force applied on the closing surface of the opening and closing means from the control chamber is equal to or greater than that applied to the opening surface of the opening and closing means from the main chamber, gas inlet means connected to the main chamber, secondary exhaust means in the control chamber, the gas inlet means being adapted to be connected to a high-pressure gas source, and externally controlled valve means for rapidly reducing the control chamber pressure to a predetermined pressure at which the force applied on the closing surface of the opening and closing means of the differential pressure system from the control chamber is less than that applied on the opening surface of the opening and closing means from the main chamber such that the opening and closing means rapidly opens and automatically closes.

* * * * *

UNITED STATES PATENT OFFICE
CERTIFICATE OF CORRECTION

Patent No. 3,638,752         Dated February 1, 1972

Inventor(s)  RALPH V. WAKEFIELD

It is certified that error appears in the above-identified patent and that said Letters Patent are hereby corrected as shown below:

IN THE SPECIFICATION:

Column 3, line 71, delete the "a".
      10, line 51, "canter" should read --center--.
      12, line 69, "sent" should read --seat--.
      13, line 13, "e" should read --be--.
      14, line 50, "beat" should read --boat--.
      15, line 51, "148" should read --1148--.
      17, line 37, "of creation" should read --or creation--.
      18, line 56, "20 27" should read --20-27--.
      19, line 55, "exhasuting" should read --exhausting--.
      20, line 30, "exhausts" should read --exhaust--.

IN THE CLAIMS:

Column 19, line 3, "portion" should read --port--.
      20, line 39, "he" should read --the--.
      22, line 30, after the word "10", insert the word --milliseconds--.
      22, line 32, "quasiexplosive" should read --quasi-explosive--.
      22, line 39, "he" should read --the--.
      22, line 43, "qualsexplosive" should read --quasi-explosive--.
      22, line 44, "he" should be --the--.
      22, line 45, "he" should be --the--.

Signed and sealed this 26th day of September 1972.

(SEAL)
Attest:

EDWARD M. FLETCHER, JR.
Attesting Officer

ROBERT GOTTSCHALK
Commissioner of Patents